(12) United States Patent
Westnedge et al.

(10) Patent No.: US 10,024,359 B2
(45) Date of Patent: Jul. 17, 2018

(54) BUSHING FOR LIFT AXLE/SUSPENSION SYSTEMS

(71) Applicant: Hendrickson USA, L.L.C., Itasca, IL (US)

(72) Inventors: Andrew J. Westnedge, Granville, OH (US); James Anthony Krueger Guntermann, Columbus, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/260,891

(22) Filed: Sep. 9, 2016

(65) Prior Publication Data

US 2017/0067504 A1    Mar. 9, 2017

Related U.S. Application Data

(60) Provisional application No. 62/215,803, filed on Sep. 9, 2015.

(51) Int. Cl.
| | |
|---|---|
| *F16C 17/02* | (2006.01) |
| *F16C 33/74* | (2006.01) |
| *F16F 1/376* | (2006.01) |
| *F16F 1/38* | (2006.01) |

(52) U.S. Cl.
CPC ............ *F16C 17/02* (2013.01); *F16C 33/74* (2013.01); *F16F 1/376* (2013.01); *F16F 1/3835* (2013.01); *B60G 2204/418* (2013.01); *F16C 2326/05* (2013.01); *F16F 2230/04* (2013.01)

(58) Field of Classification Search
CPC ....... F16C 17/02; F16C 33/74; F16C 2326/05
See application file for complete search history.

(56) References Cited

U.S. PATENT DOCUMENTS

| | | | | |
|---|---|---|---|---|
| 588,699 | A * | 8/1897 | Emery | ...................... F16C 9/04 |
| | | | | 14/36 |
| 2,981,573 | A * | 4/1961 | Reuter | .................... F16C 33/20 |
| | | | | 277/565 |
| 3,215,477 | A * | 11/1965 | Arthur | .................. F16C 13/006 |
| | | | | 384/222 |

(Continued)

FOREIGN PATENT DOCUMENTS

| | | |
|---|---|---|
| DE | 102006035467 A1 | 8/2007 |
| FR | 2473662 A1 | 7/1981 |

*Primary Examiner* — Thomas R Hannon
(74) *Attorney, Agent, or Firm* — Dureska & Moore, LLC; David P. Dureska; Brent L. Moore

(57) ABSTRACT

A bushing assembly pivotally connects the beams of an auxiliary lift axle/suspension system to a hanger and to an axle seat. The bushing assembly includes a pair of bushings, a metal sleeve, a pin with a threaded end, a pair of washers, and a threaded nut. The pair of bushings are disposed into an opening formed near an end of the beam. Each one of the pair of bushings includes a cylindrical wall comprising an inner end, an outer end, a central opening extending from the inner end to the outer end, an exterior surface, an interior surface, and a flange. The interior surface of the bushings includes at least one groove formed therein for preventing lubricant from escaping the bushing assembly during operation of the lift axle/suspension system while a sealing feature prevents contaminants from migrating into the bushing assembly.

18 Claims, 16 Drawing Sheets

(56) References Cited

U.S. PATENT DOCUMENTS

| | | | | |
|---|---|---|---|---|
| 3,239,286 A | * | 3/1966 | Harrison | F16F 1/38 384/222 |
| 3,322,475 A | | 5/1967 | Schick | |
| 3,508,745 A | | 4/1970 | Deane | |
| 3,560,034 A | | 2/1971 | Hipsher et al. | |
| 3,762,747 A | | 10/1973 | Griffen | |
| 3,888,472 A | | 6/1975 | Hofmann | |
| 4,105,267 A | * | 8/1978 | Mori | F16C 33/1065 384/291 |
| 4,916,749 A | | 4/1990 | Urban et al. | |
| 5,261,748 A | * | 11/1993 | Kameda | F16F 1/38 267/141 |
| 5,286,014 A | * | 2/1994 | Chakko | B60G 7/00 267/141.2 |
| 5,352,044 A | * | 10/1994 | Jordens | B60G 21/0551 384/140 |
| 6,170,812 B1 | * | 1/2001 | Nicoles | F16F 1/38 267/141.2 |
| 6,619,639 B1 | | 9/2003 | Shelley et al. | |
| 6,817,599 B2 | | 11/2004 | Kato et al. | |
| 8,092,092 B2 | * | 1/2012 | Barlerin | C23C 8/80 384/276 |
| 8,192,106 B2 | | 6/2012 | Vogler et al. | |
| 8,459,666 B2 | | 6/2013 | Piehl et al. | |
| 2003/0190102 A1 | * | 10/2003 | Horng | F16C 33/1065 384/292 |
| 2008/0277847 A1 | | 11/2008 | Missig | |

\* cited by examiner

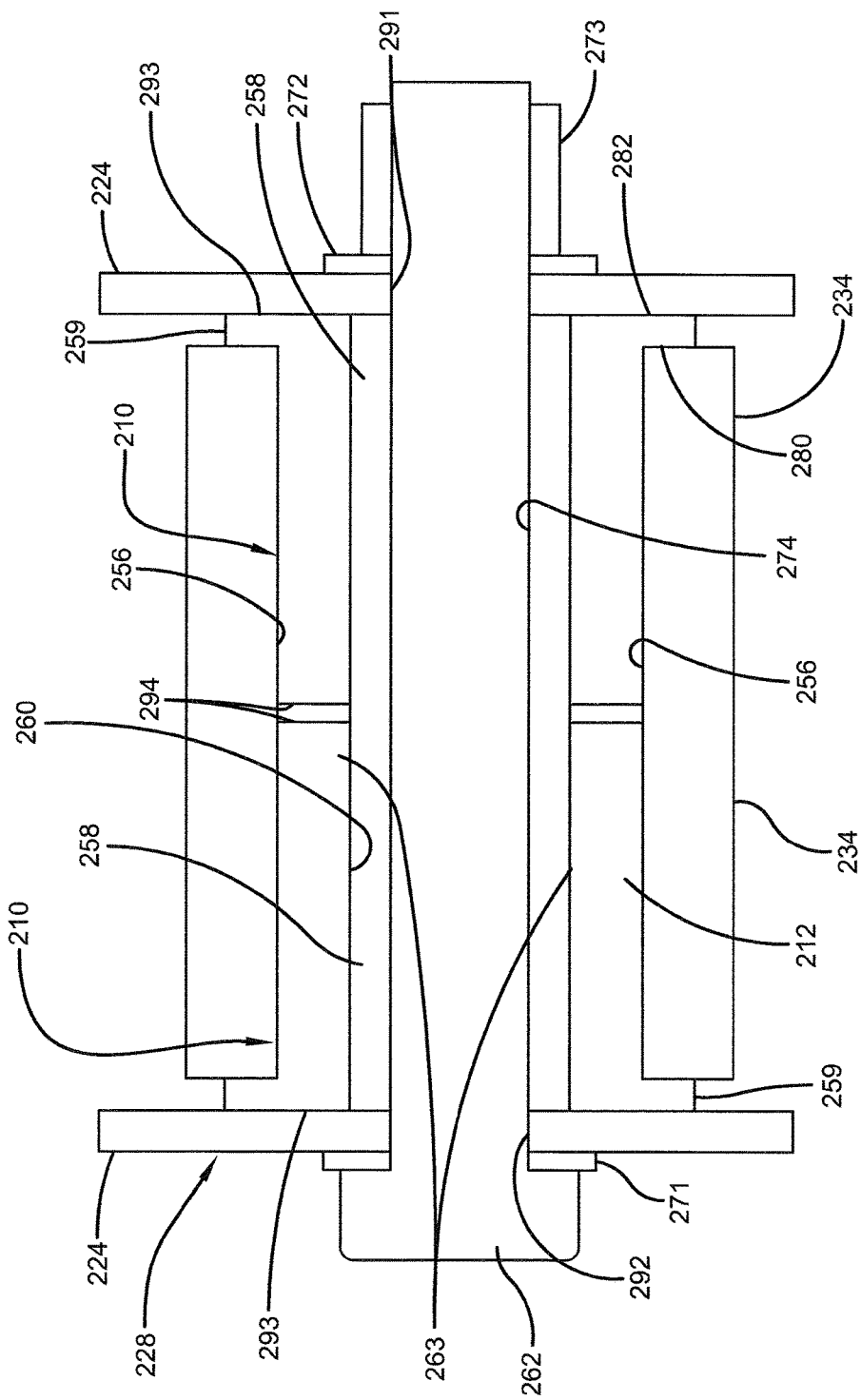

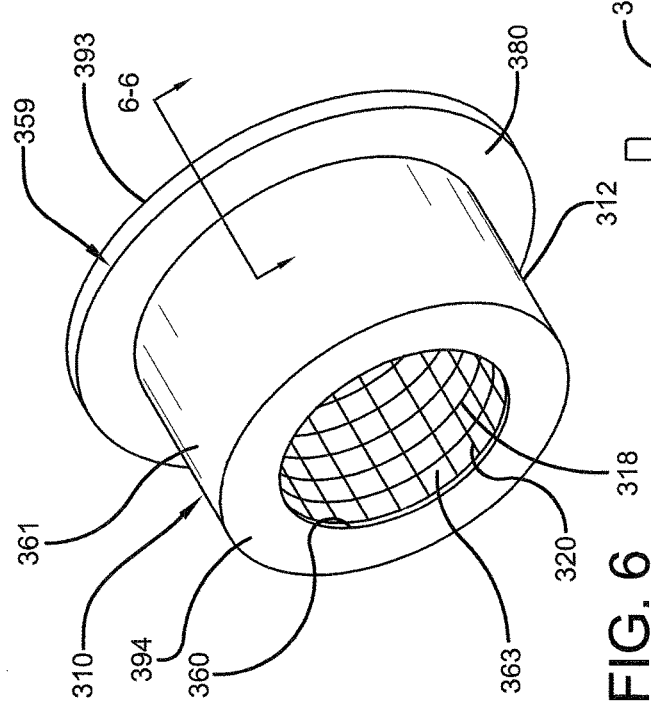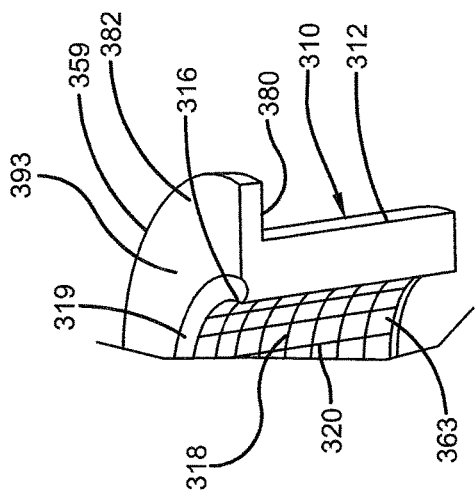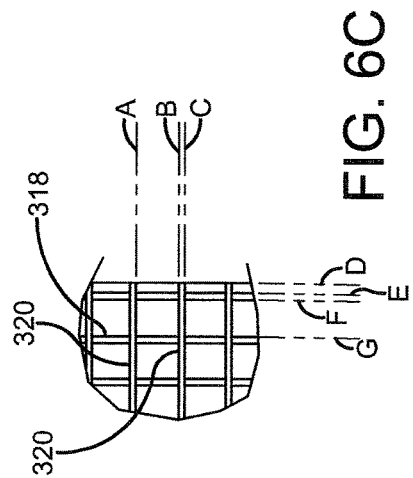

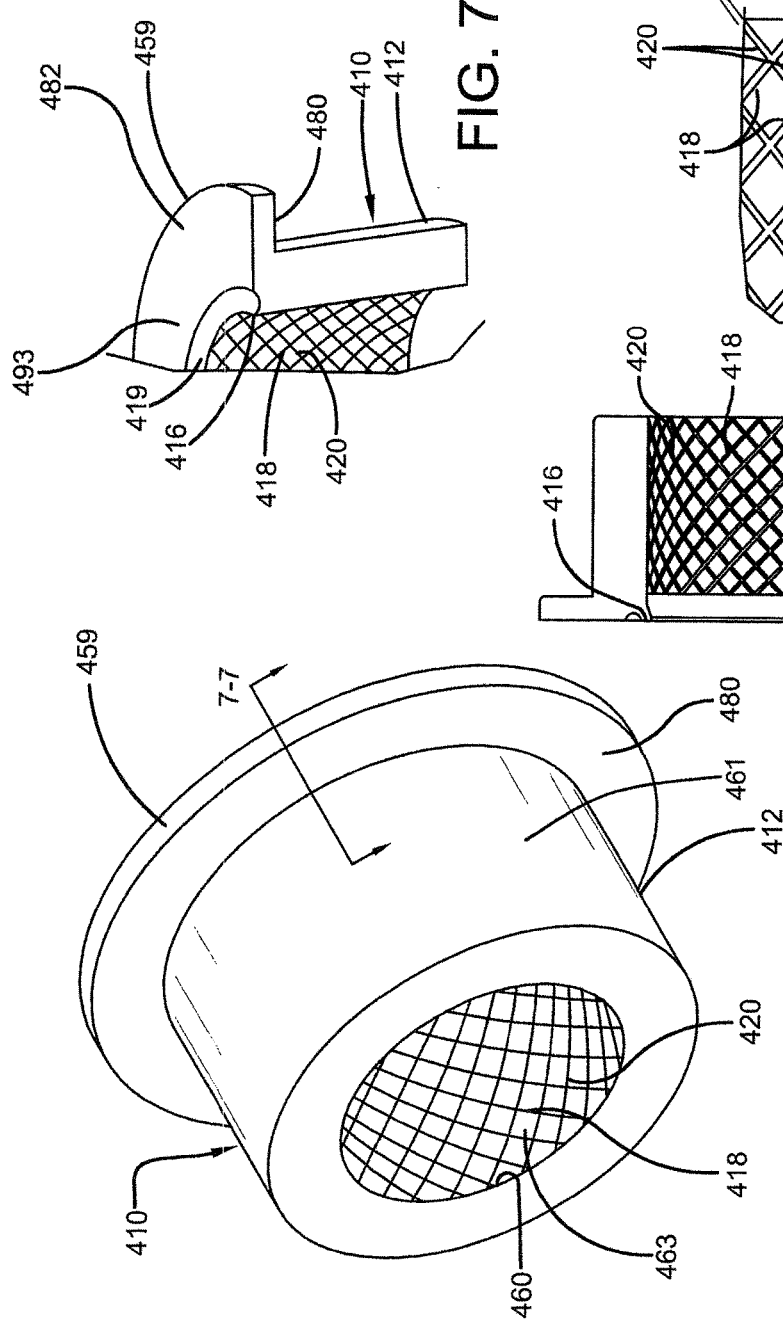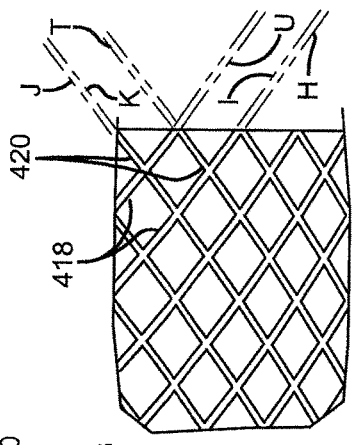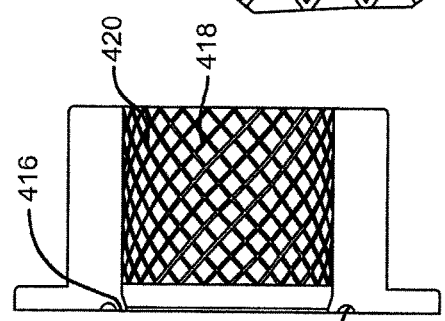

BUSHING FOR LIFT AXLE/SUSPENSION SYSTEMS

CROSS-REFERENCE TO RELATED APPLICATION

This application claims the benefit of U.S. Provisional Patent Application Ser. No. 62/215,803, filed Sep. 9, 2015.

BACKGROUND OF THE INVENTION

Field of the Invention

The present invention relates generally to bushing assemblies for lift axle/suspension systems of heavy-duty vehicles. More particularly, the present invention relates to bushing assemblies for auxiliary steerable and non-steerable lift axle/suspension systems. More specifically, the present invention relates to a bushing used in bushing assemblies for auxiliary steerable and non-steerable lift axle/suspension systems, with improved capacity to maintain even lubricant distribution throughout the bushing interior sidewall surface, prevent lubricant from escaping the bushing assembly, and prevent dirt and contaminants from entering the bushing assembly during operation of the lift axle/suspension system.

Background Art

The need for auxiliary axles on various types of vehicles (trucks, trailers, etc.) is generally well known in the heavy-duty vehicle industry. The term "auxiliary" axle, as used herein, is meant to include an axle which is not a primary axle of the vehicle. Instead, "auxiliary" axle is one usually added to the vehicle so as to be either forward or rearward of the primary axles and rearward of the vehicle's primary steering axle (e.g. in a straight truck such as a dump truck, garbage truck or the like). The purpose of adding such an auxiliary axle to the vehicle is normally to increase the load carrying capacity of the vehicle and/or to satisfy road and bridge weight limit laws. Such auxiliary axles are typically liftable so that the axle can be selectively used. In addition, such auxiliary axles may also be of the non-steerable or steerable type.

The need for certain vehicles such as heavy-duty dump trucks, semi-trailers and the like, to have at least one (and often more than one) designated wheel bearing axle/suspension system capable of being selectively raised and lowered out of and into engagement with the road surface, is also well known in the art. This need usually arises so that the vehicle is capable of legally satisfying maximum highway weight limit laws, as well as to provide an additional measure of safety when the vehicle is loaded. In this respect, such maximum weight limit laws often mandate not just a maximum vehicle weight, but further prescribe that the required number of axles needed be spaced along the underside of the vehicle in such a manner as to distribute the weight of the vehicle and its cargo over a selected length of the vehicle. These extra axles and their attached suspension systems are referred to as auxiliary axle/suspension systems, as set forth above.

A typical auxiliary lift axle/suspension system includes a pair of longitudinally extending upper and lower parallel beams on each side of the vehicle. The beams are pivotally mounted at their forward ends in a known manner by prior art pivot bushing assemblies to a side rail frame hanger bracket, which, in turn, is fastened to a longitudinal frame member of the vehicle. The beams are also pivotally connected at their rearward ends to an axle seat by additional prior art pivot bushing assemblies. The axle seats are mounted onto a laterally extending axle. An inline lift air spring is mounted to each pair of upper and lower beams through brackets which in turn are connected to the beams. A vertical ride air spring is mounted on each axle seat and also is connected to the frame member of the vehicle.

Raising and lowering the lift axle/suspension system is accomplished by the expansion and contraction of the inline lift air springs and the vertical ride air springs. More specifically, by expanding the vertical ride air springs and exhausting the inline lift air springs, the wheels mounted on the lift axle/suspension system are lowered into engagement with the ground surface. Conversely, by expanding the inline lift air springs and exhausting the vertical ride air springs, the wheels mounted on the lift axle/suspension system are raised from engagement with the ground surface. The control of fluid flow into and out of the air springs for accomplishing the raising and lowering of the wheels is conventional and well known in the art.

Bushing assemblies for pivotally connecting the beams of the auxiliary lift axle/suspension system to the hanger and to the axle seat are known in the art. One such prior art bushing assembly includes a pair of urethane bushings, a metal sleeve, a pin with a threaded end, a pair of washers, and a threaded nut. The pair of urethane bushings are disposed into an opening formed near the end of the beam. Each one of the pair of urethane bushings includes a central lubricated opening into which the metal sleeve is disposed. The threaded pin is disposed through the metal sleeve and generally connects the beam to either the frame hanger or a clevis on the axle seat, when the threaded nut is threadably engaged onto the end of the pin. The urethane bushings rotate about the metal sleeve and allow pivotal movement of the beam with respect to the hanger or the axle seat.

Because the exterior surface of the metal sleeve is relatively smooth and uniform with the interior surface of the bushings, lubricant can potentially leak or be pushed out of the outer end of the metal sleeve-to-bushing interface during normal operation of the bushing assembly. In addition, because the bushing interior surface is relatively smooth, as the bushing rotates with respect to the metal sleeve, lubricant is more likely to migrate during rotation, potentially resulting in insufficiently lubricated areas within the metal sleeve-to-bushing interface. This condition can potentially result in premature wear of the components of the bushing assembly. Additionally, the metal sleeve-to-bushing interface of the prior art is generally unsealed at the outer end of the bushing where a flange is located, potentially resulting in leakage of lubricant at the outer end of the metal sleeve-to-bushing interface and also potentially allowing entry of dirt and contaminants into the metal sleeve-to-bushing interface during operation of the bushing assembly. This condition can also result in premature wear and increased strain on the components of the bushing assembly which in turn may require more frequent maintenance of the bushing assembly to prevent such premature wear.

Due to the potential problems associated with prior art bushings discussed above, it is desirable to have a bushing that keeps lubricant in place and distributed throughout the interior surface of the bushing, adequately prevents lubricant from leaking out of the bushing-to-metal sleeve interface, and prevents dirt and contaminants from entering the interface during operation of the bushing assembly.

SUMMARY OF THE INVENTION

An objective of the present invention includes providing a bushing for auxiliary lift axle/suspension systems that overcomes the problems associated with prior art bushings set forth above.

A further objective of the present invention is to provide a bushing that effectively maintains even distribution of the lubricant around the metal sleeve-to-bushing interface and preventing migration of the lubricant during operation of the bushing assembly.

Yet another objective of the present invention is to provide a bushing that creates a tight seal between the bushing and the inserted metal sleeve, preventing lubricant from escaping from the outer end of the bushing-to-metal sleeve interface and preventing dirt and unwanted contaminants from entering the outer end of the metal sleeve-to-bushing interface during operation of the bushing assembly.

These objectives and advantages are obtained by the bushing for a bushing assembly of a heavy-duty vehicle axle/suspension system. In an exemplary embodiment of the invention, a bushing assembly includes a bushing, and the bushing comprises a cylindrical sidewall, and a central opening which extends from an inner end to an outer end of the bushing. The bushing includes an exterior surface and an interior surface. The interior surface comprises at least one groove formed in the interior surface of the bushing. The bushing further includes a flange extending radially from the outer end of said cylindrical sidewall.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

FIG. 5G is a cross-sectional view of a bushing assembly of an auxiliary lift axle/suspension system, showing a pair of the first preferred embodiment bushings incorporated into the assembly;

FIG. 6 is an inner end perspective view of a second preferred embodiment auxiliary lift axle/suspension system bushing of the present invention;

FIG. 6A is a fragmentary sectional view taken along line 6-6 of the second preferred embodiment bushing shown in FIG. 6, showing the textured interior surface of the bushing sidewall and showing the outer end of the bushing adjacent the flange formed with a lip;

FIG. 6B is a sectional view of the second preferred embodiment bushing shown in FIG. 6;

FIG. 6C is a greatly enlarged fragmentary view of the textured interior surface of the bushing sidewall shown in FIG. 6, showing the perpendicular grooves formed in the interior surface of the bushing sidewall;

FIG. 7 is an inner end perspective view of a third preferred embodiment auxiliary lift axle/suspension system bushing of the present invention;

FIG. 7A is a fragmentary sectional view taken along line 7-7 of the third preferred embodiment bushing shown in FIG. 6, showing the textured interior surface of the bushing sidewall and showing the outer interior end of the bushing adjacent the flange formed with a lip;

FIG. 7B is a sectional view of the third preferred embodiment bushing shown in FIG. 7;

FIG. 7C is a greatly enlarged fragmentary view of the textured surface of the bushing interior sidewall shown in FIG. 7, showing the cross-hatch grooves formed in the interior surface of the bushing sidewall;

Similar numerals refer to similar parts throughout the drawings.

DESCRIPTION OF THE PREFERRED EMBODIMENT

Figure 1:
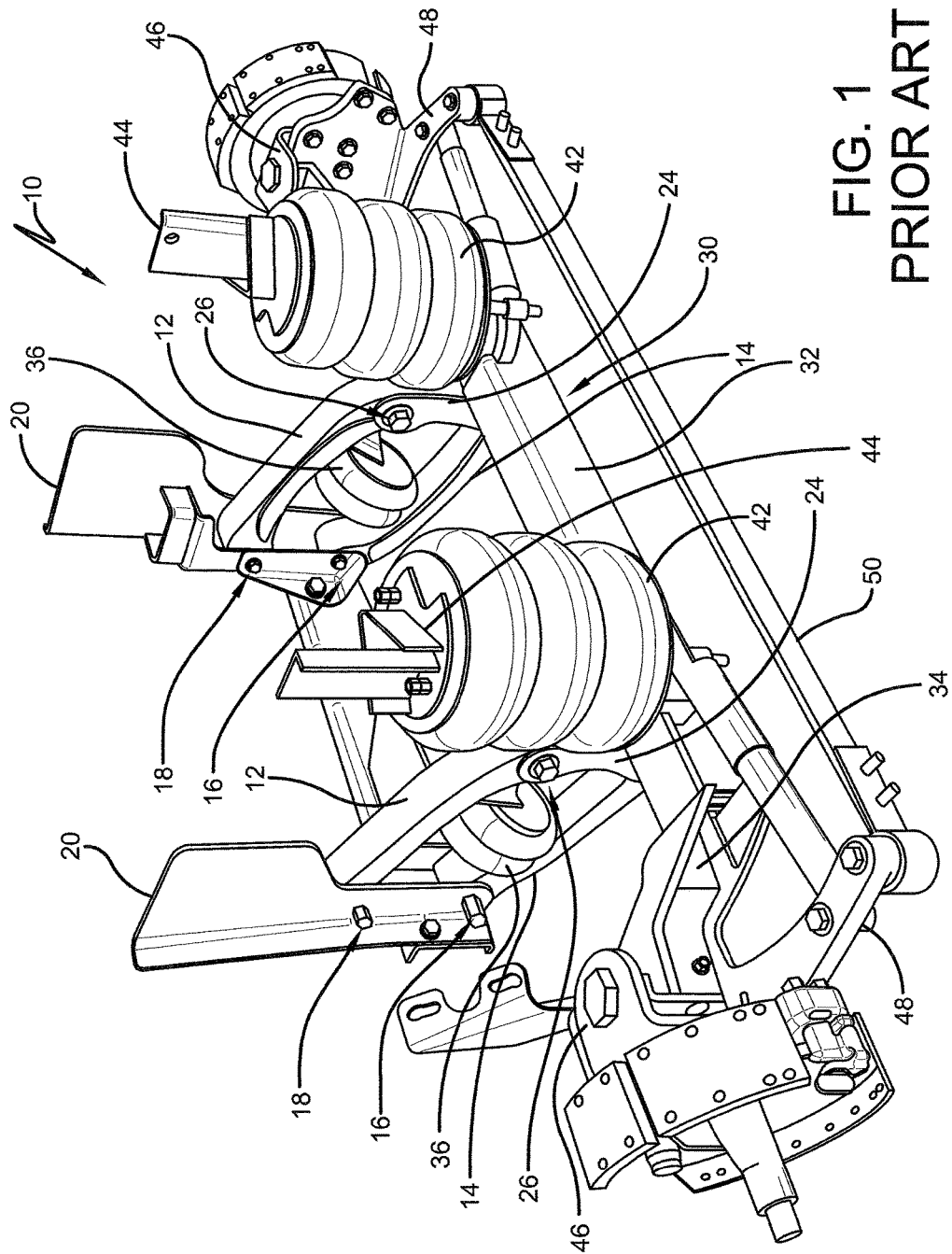
FIG. 1 is a rear driver side perspective view of an auxiliary lift axle/suspension system for a heavy-duty vehicle, showing a steerable axle incorporated into the lift axle/suspension system with the wheel assemblies removed.

In order to better understand the bushing of the present invention and the environment in which it operates, a plurality of prior art bushing assemblies incorporated into an auxiliary lift axle/suspension system 10 are shown in FIGS. 1-3A at reference numerals 16, 18, 26, 28 and will now be described in detail below.

Auxiliary lift axle/suspension system 10 is a self-steering auxiliary lift-axle type suspension system having a parallelogram, trailing arm geometry. Lift axle/suspension system 10 preferably is a relatively lightweight suspension designed to permit compliance with any applicable bridge weight and stress regulations, such as the Federal Bridge Formula associated with the relevant laws and regulations applicable within the United States of America.

With respect to lift axle/suspension system 10, the majority of the components positioned on one side of the vehicle will have correspondingly similar components positioned on the other side of the vehicle. Accordingly, in this description, when reference is made to a particular suspension component, it will be understood that a similar component is present on the opposite side of the vehicle, unless otherwise apparent.

With reference to FIGS. 1-3A, lift axle/suspension system 10 includes a pair of upper and lower longitudinally extending parallel beams 12, 14, respectively, on each side of the vehicle (not shown), both constructed as composite beams. Upper and lower beams 12,14 are pivotally connected at their forward ends in a known manner by pivot bushing assemblies 18, 16, respectively, to a side rail frame hanger bracket 20 which, in turn, is fastened to a longitudinal frame member 22 (FIGS. 2A, 2B) of the vehicle. Frame member 22 extends longitudinally and has a C-shaped cross-section with the open portion facing generally inboardly.

Upper and lower parallel beams 12, 14 also are pivotally connected at their rearward ends to an axle seat 24 by pivot bushing assemblies 26, 28, respectively. Axle seat 24 is mounted on a laterally extending fabricated axle 30 having a hollow axle body 32 and gooseneck portions 34 on each end of the axle body. An inline lift air spring 36 is mounted to beams 12, 14 via brackets 38, 40, respectively. A vertical ride air spring 42 is mounted on axle seat 24 and is connected to frame member 22 through upper air spring bracket 44.

Steering knuckles 46 are rotatably mounted on opposite ends of axle 30 by king pin assemblies (not show) in a known manner. The king pins are utilized to mount steering knuckles 46 to axle 30. Each steering knuckle 46 includes a steering arm 48, and a laterally extending tie rod 50 links the steering arms of the steering knuckles mounted on opposite sides of the vehicle.

Figure 2A:
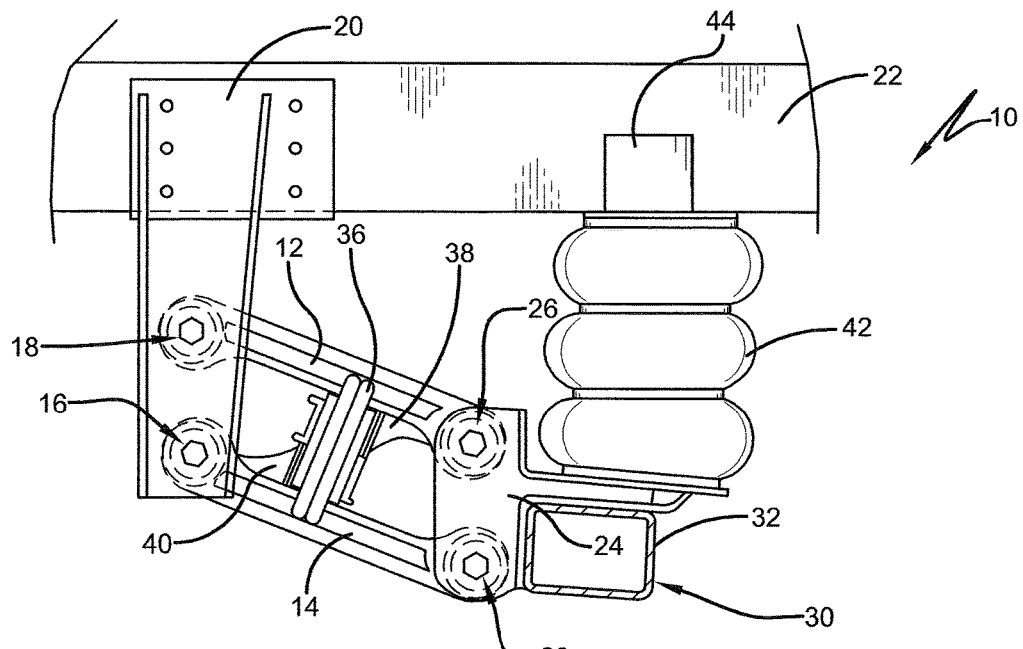
FIG. 2A is a fragmentary driver side elevational view, with hidden portions shown in broken lines and with portions in section, of the auxiliary lift axle/suspension system shown in FIG. 1, showing the lift axle/suspension system in its lowered or ground engaging position.
Figure 2B:
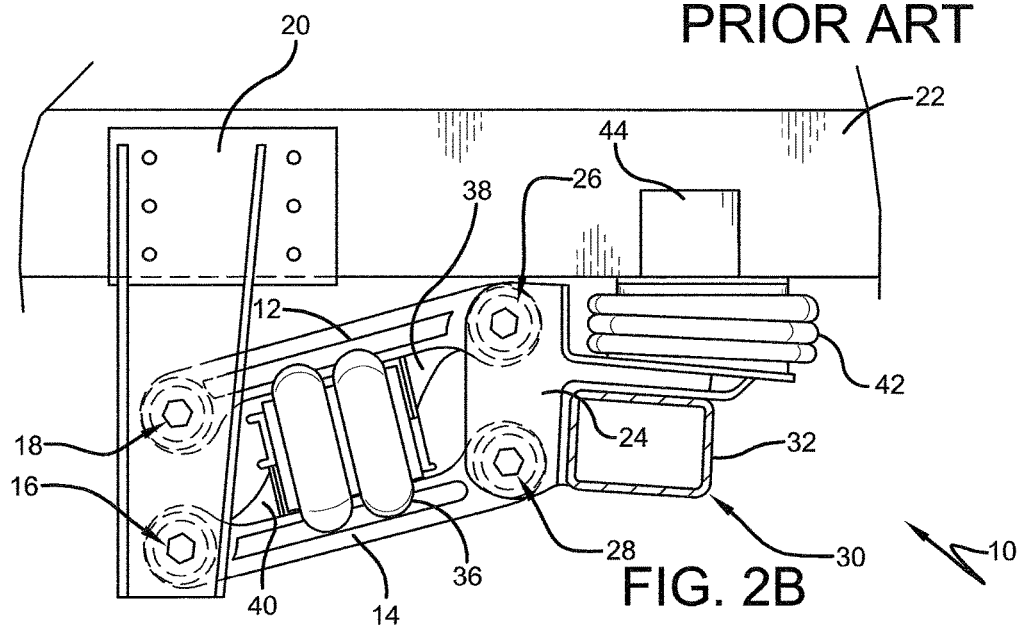
FIG. 2B is a fragmentary driver side elevational view, with hidden portions shown in broken lines and with portions in section, of the auxiliary lift axle/suspension system shown in FIG. 1, showing the lift axle/suspension system in its raised position.

FIG. 2A shows lift axle/suspension 10 in its lowered or ground-engaging position, as opposed to its lifted or raised position, which is shown in FIG. 2B. The raising and lowering of lift axle/suspension 10 is accomplished by the expansion and contraction of inline lift air springs 36 and the vertical ride air springs 42. By expanding the vertical ride air springs 42 and exhausting the inline lift air springs 36, the wheels (not shown) are lowered into engagement with the ground surface, as shown in FIG. 2A. By expanding inline lift air springs 36 and exhausting vertical ride air springs 42, the wheels (not shown) attached to auxiliary lift axle/suspension system 10 are raised from engagement with the ground surface, as shown in FIG. 2B. The control of fluid into and out of the air springs 36, 42 for accomplishing the raising and lowering of the wheels (not shown) is conventional and well known in the art.

Figure 3:
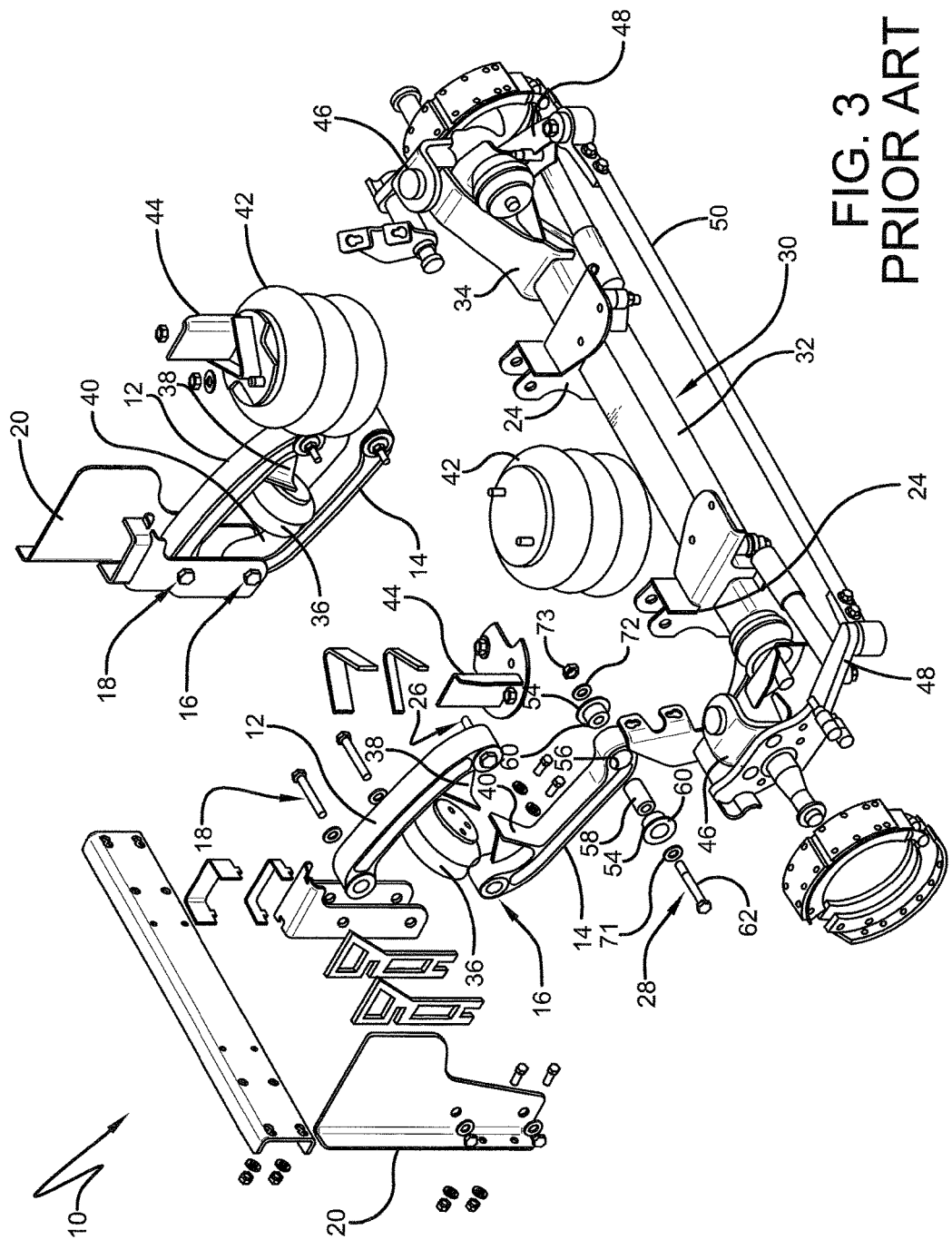
FIG. 3 is an exploded view of the auxiliary lift axle/suspension system shown in FIG. 1, showing the rear prior art bushing assembly for the driver side lower control arm of the auxiliary lift axle/suspension system.
Figure 3A:
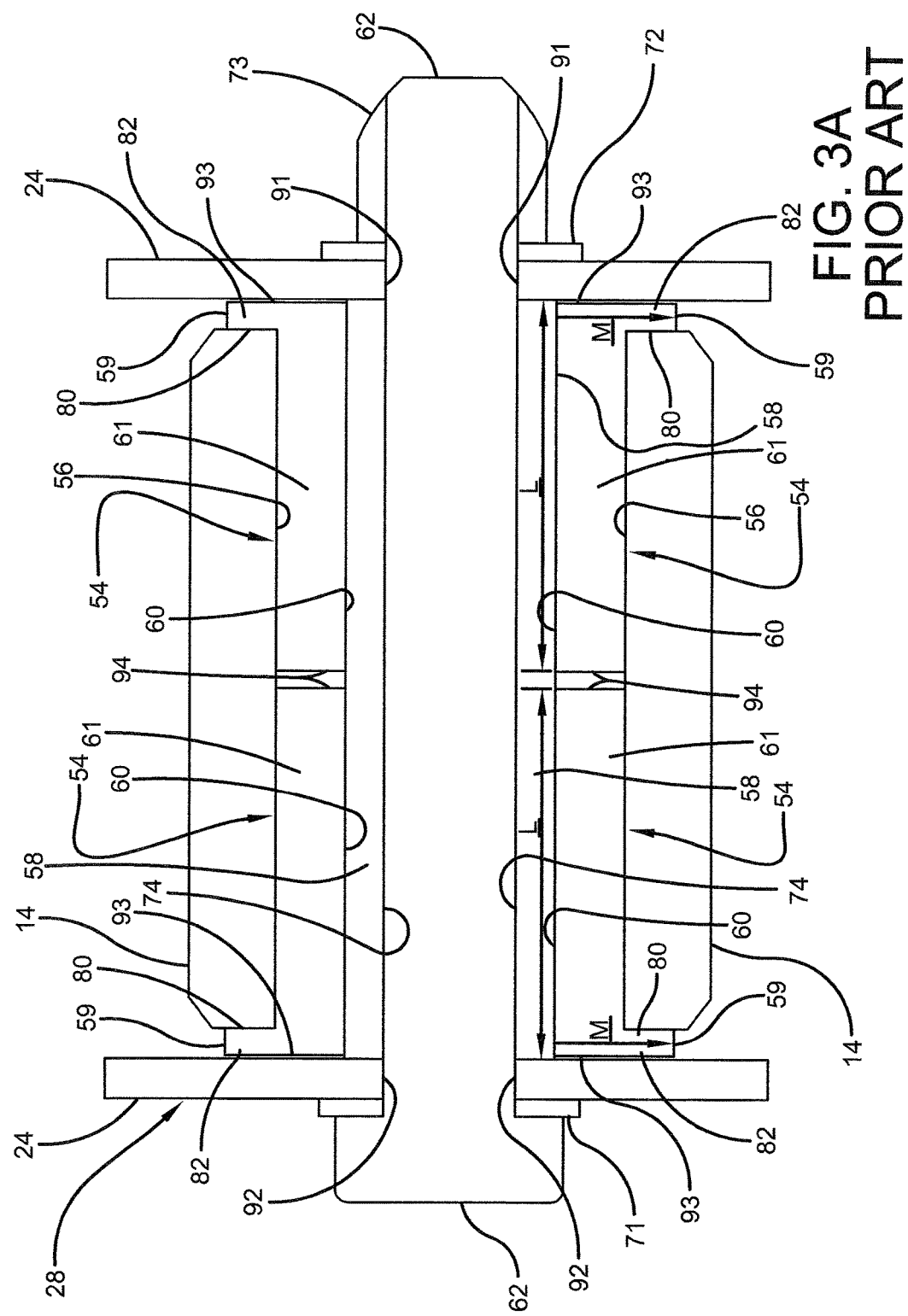
FIG. 3A is a cross-sectional view of the prior art bushing assembly shown in FIG. 3 after assembly, showing two prior art bushings incorporated into the bushing assembly.
Figure 4A:
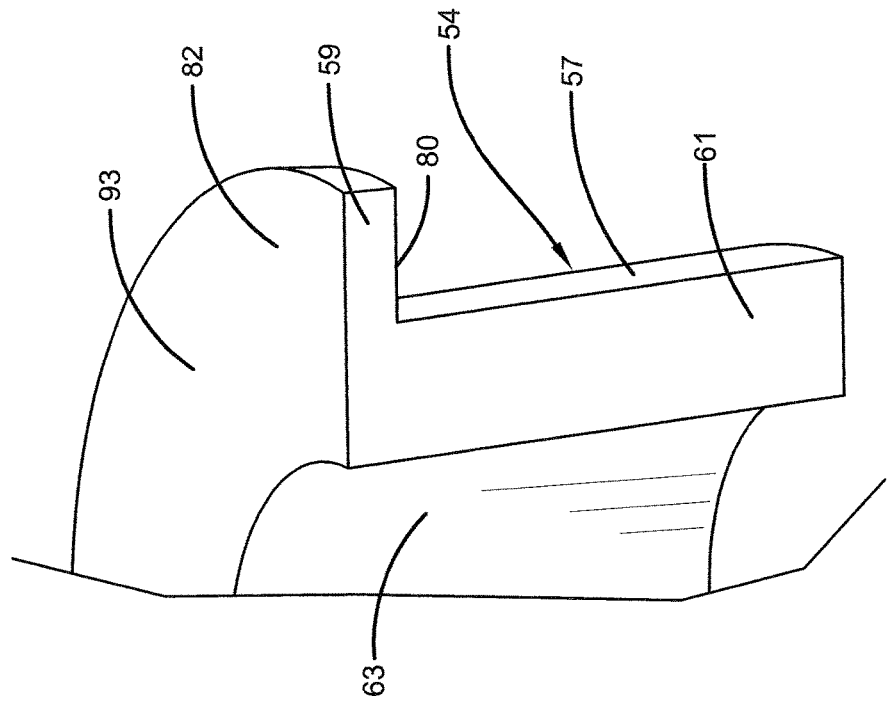
FIG. 4A is a fragmentary sectional view taken along line 4-4 of the prior art auxiliary lift axle/suspension system bushing shown in FIG. 4, showing the smooth interior surface of the bushing sidewall and the generally flat outwardly-extending bushing flange.
Figure 4:
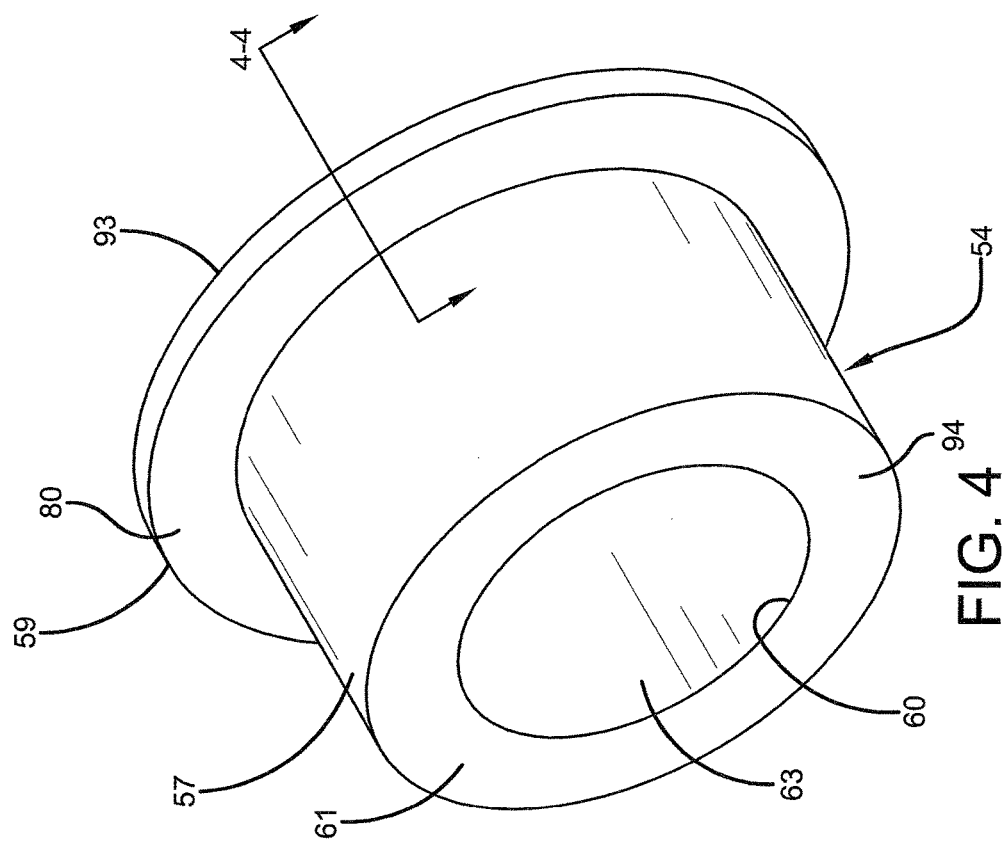
FIG. 4 is an enlarged inner end perspective view of a prior art auxiliary lift axle/suspension system bushing.

Because prior art bushing assemblies 16, 18, 26, and 28 are generally identical to one another, for the sake of clarity and conciseness, only bushing assembly 28 will be described in detail below with the understanding that generally identical bushing assemblies 16, 18, and 26 are present in auxiliary lift axle/suspension system 10. With particular reference to FIGS. 3-4A, bushing assembly 28 includes two prior art bushings 54 that are inserted into opposite sides of an opening 56 formed in the rear end of beam 14.

Prior art bushing 54 is generally cylindrical-shaped, formed from urethane, and includes an inner end 94 and an outer end 93. A continuous central opening 60 is formed through bushing 54 and extends from inner end 94 to outer end 93. More specifically, bushing 54 includes a generally cylindrical-shaped sidewall 61 that extends from bushing inner end 94 to bushing outer end 93. Bushing sidewall 61 includes a generally smooth interior surface 63 and a generally smooth exterior surface 57. Bushing sidewall 61 is formed with a generally flat radially extending flange 59 at bushing outer end 93. Flange 59 includes inner and outer surfaces 80, 82, respectively.

Prior art bushing assembly 28 includes an inner metal sleeve 58 formed with a continuous opening 74 which is disposed through bushing opening 60 of each bushing 54. A threaded pin 62 is disposed through a first washer 71, through a first opening 92 formed in axle seat 24, through metal sleeve opening 74, through a second aligned opening 91 formed in the axle seat, through a second washer 72, and threadably engages a threaded nut 73 to complete bushing assembly 28. Bushing assembly 28 pivotally connects beam 14 to axle seat 24. It should be noted that prior to assembly, lubricant is typically applied to the bushing sidewall interior surface 63.

As set forth above, prior art bushing assembly 28 is shown having a two-piece bushing construction, but one-piece bushing constructions are also well known in the art. During operation of auxiliary lift axle/suspension system 10, bushing 54 rotates about metal sleeve 58 and allows pivotal movement of the beam during operation of the vehicle, and also, during raising and lowering of the lift axle/suspension system.

Because prior art bushings 54 have relatively smooth sidewall interior surfaces 63, lubricant introduced into the bushing-to-metal sleeve interface can migrate throughout the interface, as is indicated by L (FIG. 3A), during rotation of the bushings about metal sleeve 58, potentially resulting in inadequately lubricated areas within the interface. This can potentially result in premature wear and increased strain of the components of bushing assembly 28 during operation of auxiliary lift axle/suspension system 10. In order to prevent premature wear of the bushing assembly components, increased maintenance may need to be performed to ensure adequate lubrication of the bushing-to-metal sleeve interface, resulting in increased operational costs. Furthermore, because there is no seal at the outer end of the bushing-to-metal sleeve interface, lubricant that migrates beyond the interface can potentially leak out through the space between axle seat 24 and outer surface 82 of flange 59, as indicated by M (FIG. 3A), potentially resulting in premature wear of the bushing assembly components due to inadequate lubrication of the interface. Additionally, dirt and contaminants can potentially enter into the interface, increasing the potential for premature wear of bushing assembly 28.

The problems associated with prior art bushings described above are overcome by the preferred embodiment bushings of the present invention for auxiliary lift axle/suspension systems, which will be described in detail below.

With reference to FIGS. 5, 5A, 5B, 5C, 5D, 5E, and 5F, a first preferred embodiment bushing 210 of the present invention is utilized in a bushing assembly 228 in an auxiliary lift axle/suspension system, such as auxiliary lift axle/suspension system 10 described above.

With continued reference to FIGS. 5, 5A, 5B, 5C, 5D, 5E, and 5F, first preferred embodiment bushing 210 for auxiliary lift axle/suspension systems of the present invention is generally cylindrical-shaped, formed from urethane, and includes an inner end 294 and an outer end 293. A continuous central opening 260 is formed through bushing 210 and extends from inner end 294 to outer end 293. More specifically, bushing 210 includes a cylindrical sidewall 261 that extends from bushing inner end 294 to bushing outer end 293. Bushing sidewall 261 is formed with a radially extending generally planar flange 259 at bushing outer end 293. Flange 259 includes inner and outer surfaces 280, 282, respectively. First preferred embodiment bushing 210 preferably has a durometer of from about 88 Shore A to about 96 Shore A. Most preferably, first preferred embodiment bushing 210 has a durometer of from about 89 Shore A to about 91 Shore A.

With particular reference to FIG. 5G, a bushing assembly 228 includes a pair of first preferred embodiment bushings 210 that are inserted into opposite sides of an opening 256 formed in the rear end of a beam 234 so that a bushing sidewall exterior surface 212 engages opening 256 and inner flange surface 280 contacts the side of beam 234. An inner metal sleeve 258 formed with a continuous opening 274 is disposed through bushing central opening 260 of each bushing 210. A threaded pin 262 is disposed through a first washer 271, through a first opening 292 formed in an axle seat 224, through metal sleeve opening 274, through a second aligned opening 291 formed in axle seat 224, through a second washer 272, and engages a threaded nut 273 to complete bushing assembly 228. Bushing assembly 228 pivotally connects beam 234 to axle seat 224. It should be noted that prior to assembly, lubricant is typically applied to a bushing sidewall interior surface 263.

Figure 5:
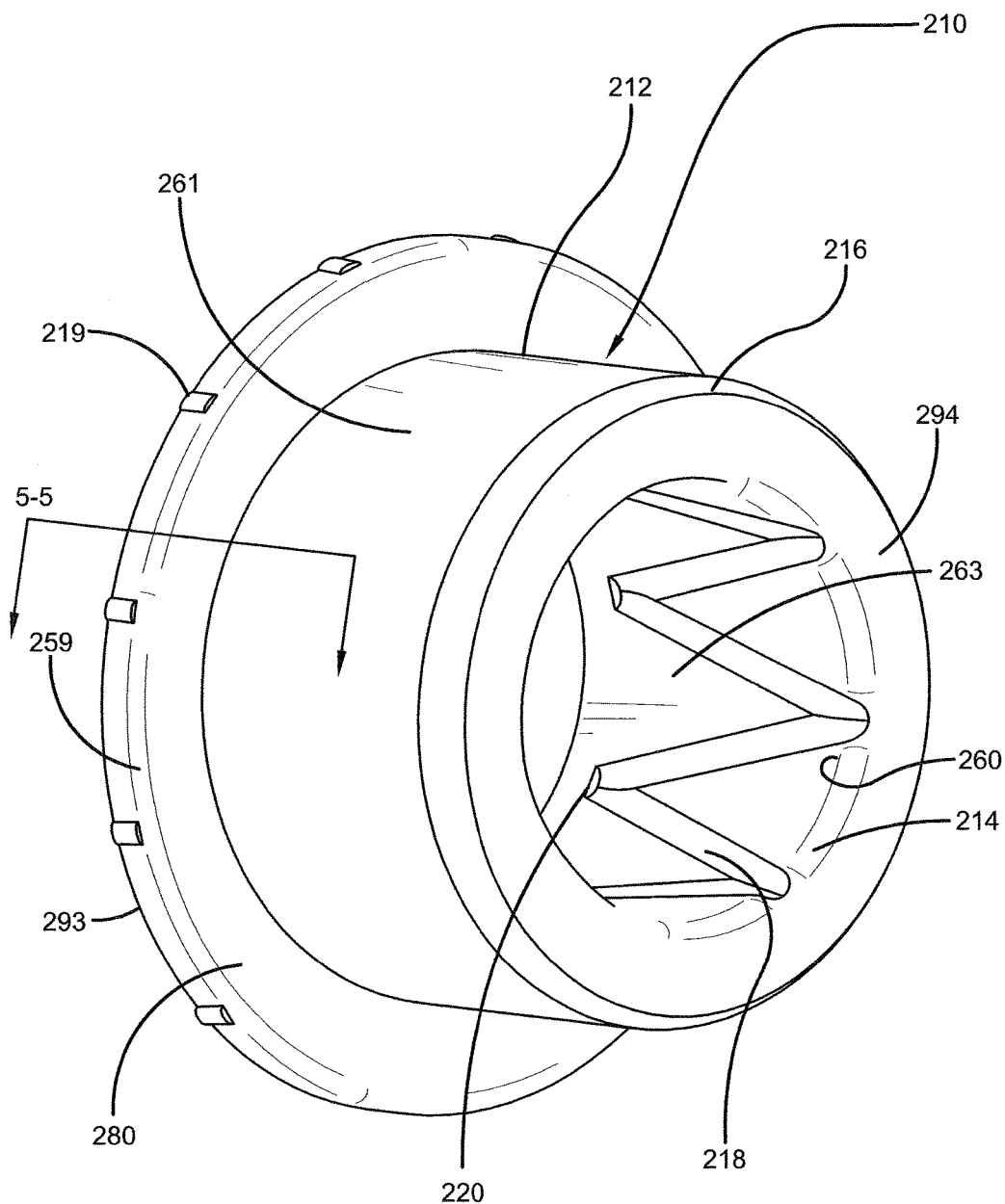
FIG. 5 is an inner end perspective view of a first preferred embodiment auxiliary lift axle/suspension system bushing of the present invention.
Figure 5A:
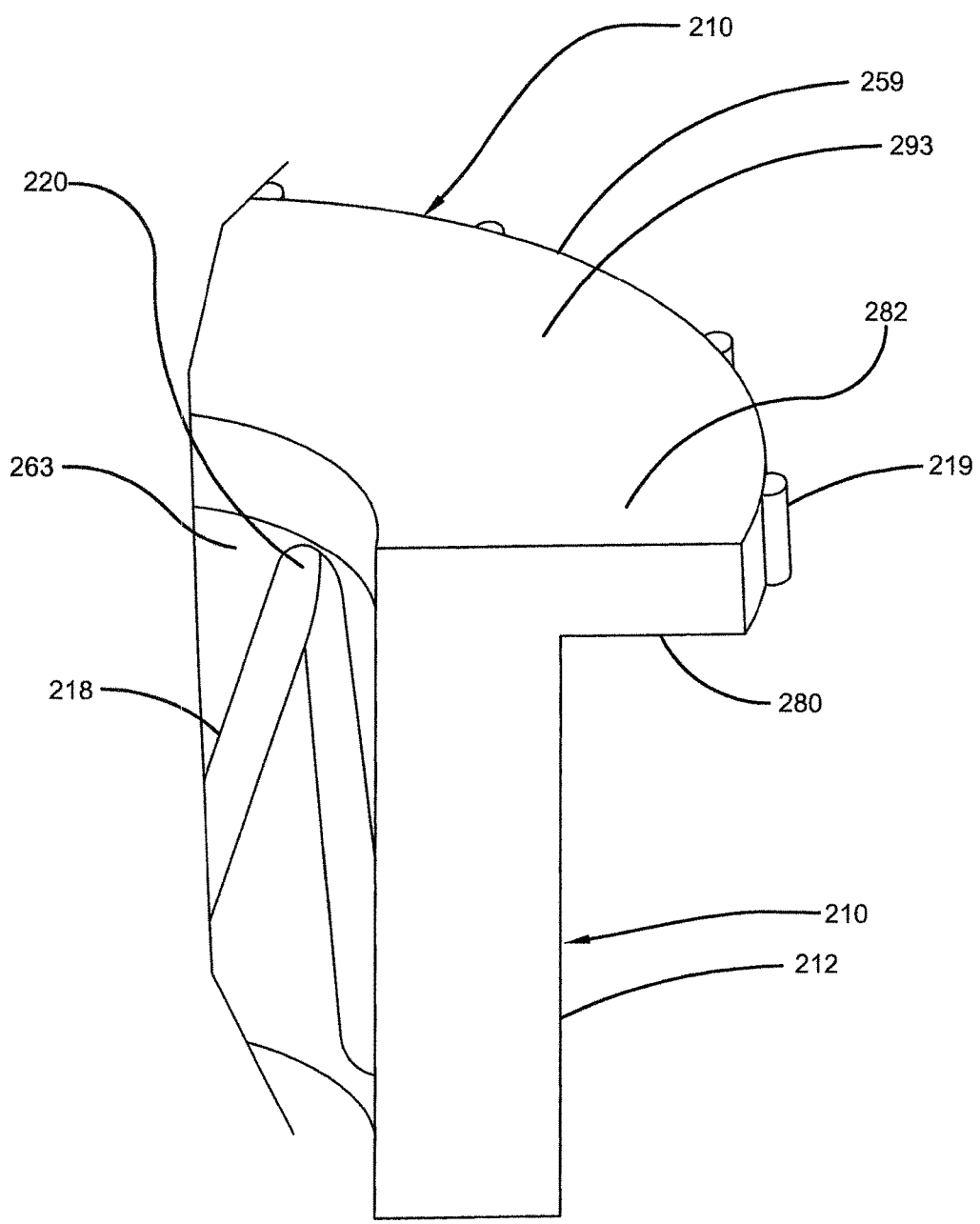
FIG. 5A is a fragmentary sectional view taken along line 5-5 of the first preferred embodiment bushing shown in FIG. 5, showing the textured surface of the bushing interior sidewall and showing the outer end of the bushing adjacent the flange and a bumper on an outer perimeter of the flange.
Figure 5B:
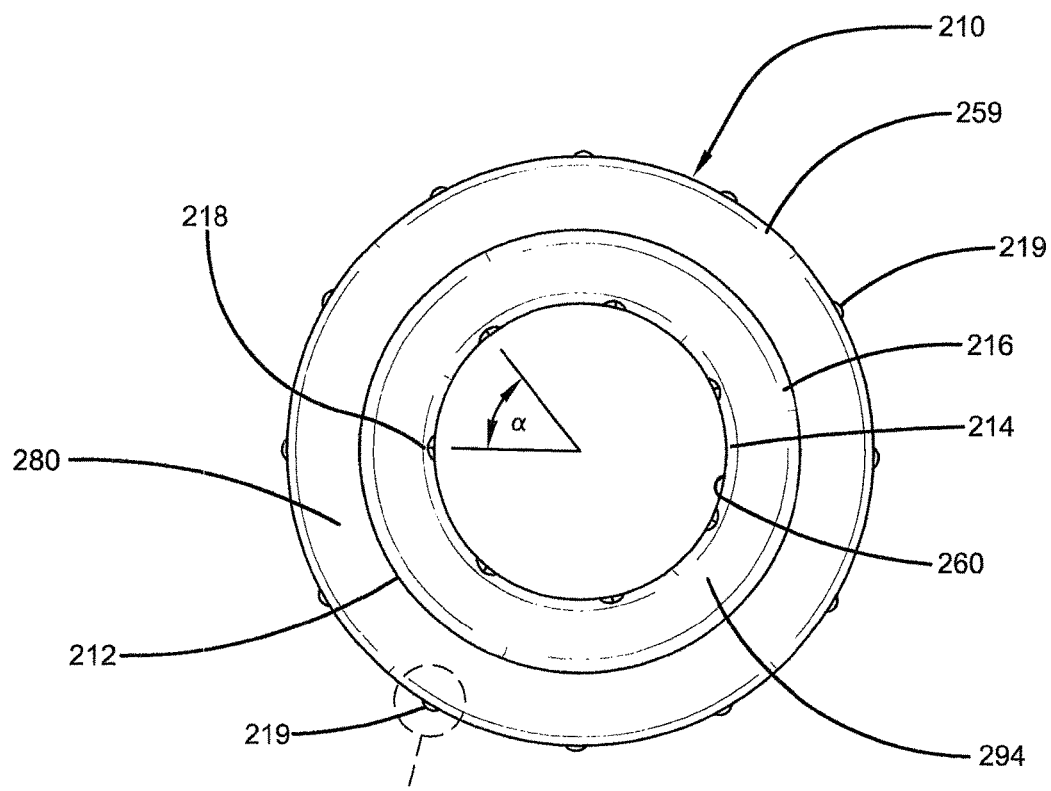
FIG. 5B is an end view from the inner side of the first preferred embodiment auxiliary lift axle/suspension system bushing shown in FIG. 5, showing the inner end of the bushing, a filleted portion formed in the interior surface adjacent the inner end of the bushing, a chamfered portion formed in the outer surface adjacent the inner end, and a plurality of bumpers extending from the outer perimeter of the flange.
Figure 5C:
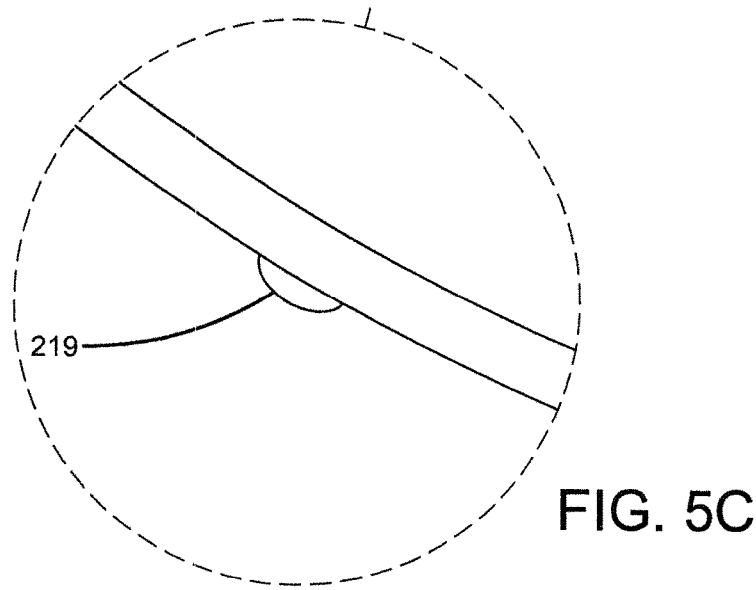
FIG. 5C is a greatly enlarged fragmentary view of one of the bumpers shown in FIG. 5B extending from the outer perimeter of the flange.

Turning now to FIGS. 5, 5A, 5B, 5C, 5D, 5E, and 5F, in accordance with an important feature of first preferred embodiment bushing 210, bushing sidewall 261 includes interior surface 263 that features a plurality of generally opposed helical or V-shaped grooves 218. There are seven V-shaped grooves shown in first preferred embodiment bushing 210 in FIGS. 5, 5A, 5B, 5C, 5D, 5E, and 5F for exemplary purposes without limitation, and it should be understood that the present invention includes any number of such grooves. With particular reference to FIGS. 5B and 5C, a plurality of bumpers 219 extend from an outer perimeter 295 of flange 259.

Figure 5D:
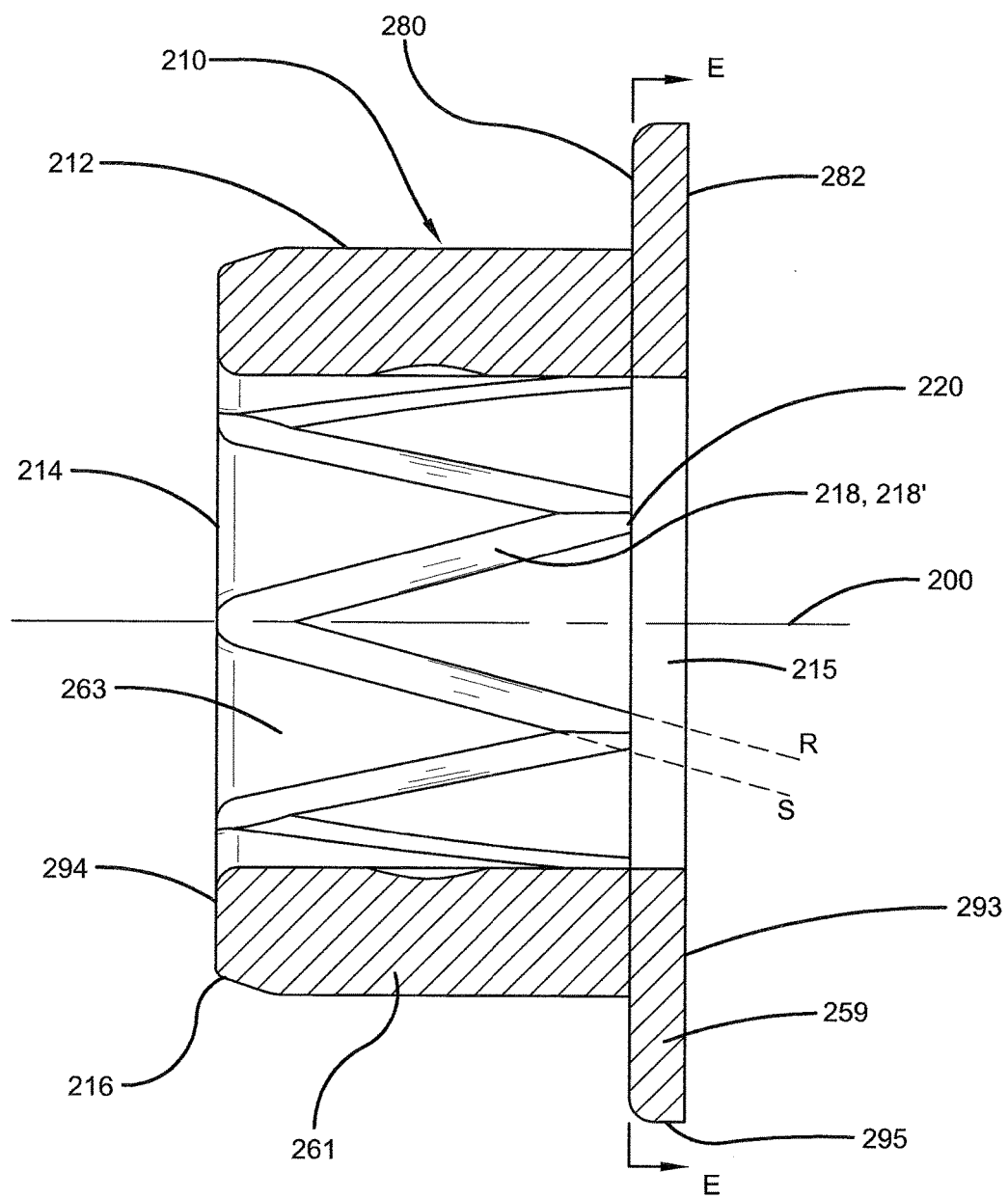
FIG. 5D is a sectional side elevational view of the first preferred embodiment bushing shown in FIG. 5, showing a central axis of the bushing and helical grooves formed in the interior surface of the bushing and angled relative to the central axis.
Figure 5E:
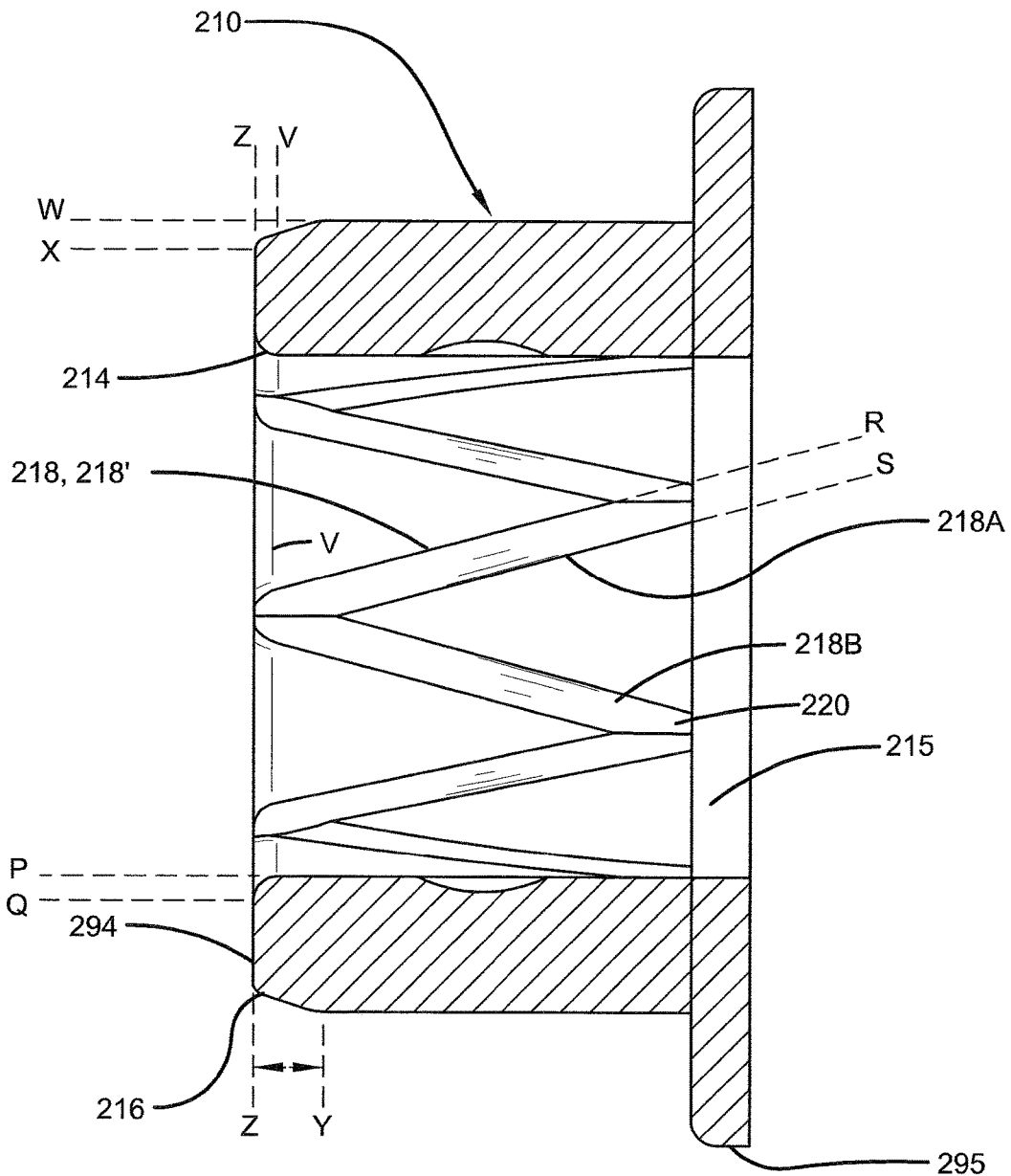
FIG. 5E is a greatly enlarged view similar to FIG. 5D, showing the width of the helical grooves as well as the width of the filleted and chamfered portions of the bushing sidewall.

Turning now to FIGS. 5C, 5D and 5E, a single generally V-shaped groove 218' of the plurality of generally V-shaped grooves 218 comprises a pair of opposite turning helical grooves 218A, 218B, and a joint 220 formed where one end of each helical groove 218A, 218B meet one another and begin to extend to an outer end 293 until each helical groove meets a sealing section 215. Each helical groove 218A, 218B, respectively, meets another adjacent helical groove of the generally V-shaped grooves 218 at sealing section 215. Joint 220 is disposed at inner end 294 where joint 220 meets a filleted portion 214 of interior surface 263. Each single generally V-shaped groove is generally equally spaced apart from one another at an angle α and a pitch about central axis 200 of bushing 210. In addition, each helical groove 218A, 218B forming single V-shaped groove 218' includes a pitch, measured as the distance between the end of the helical groove adjacent inner end 294 to a full hypothetical helical turn of the helical groove extending axially from interior surface 263 adjacent outer end 293. Angle α between each generally V-shaped groove relative to central axis 200 is preferably from about 36 degrees to about 120 degrees depending on the number of helices spaced around the bushing as discussed in more detail below. Most preferably, angle α relative to central axis 200 is 51.5 degrees. Each helical groove 218A, 218B, respectively, preferably has a pitch of from about 838.2 millimeters (33 inches) to about 990.6 millimeters (39 inches). Most preferably, the pitch of each helical groove 218A, 218B is about 914.4 millimeters (36 inches). Central axis 200 of bushing 210 is generally perpendicular to the generally flat inner surface 280 and outer surface 282 of flange 259. Sealing section 215 is free of grooves and forms a tight seal around the circumference of metal sleeve 258, sealing outer end 293 of the bushing-to-metal sleeve interface. First preferred embodiment bushing 210 preferably includes 3 to 10 generally V-shaped grooves 218 formed in interior surface 263 of bushing sidewall 261. Most preferably, interior surface 263 of bushing sidewall 261 includes 7 V-shaped grooves 218.

Figure 5F:
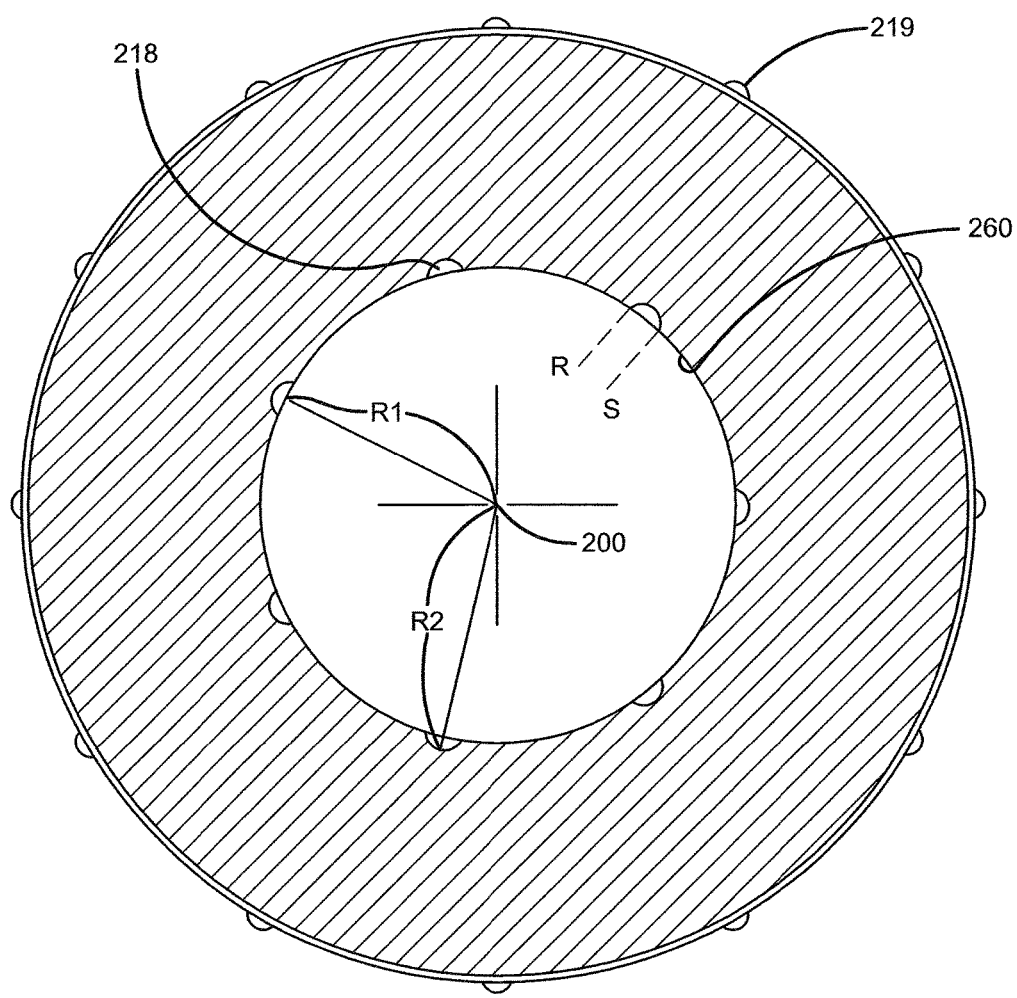
FIG. 5F is a sectional view taken along line E-E of the first preferred embodiment bushing shown in FIG. 5D, showing the width and the depth of the helical grooves.

Turning now to FIGS. 5D, 5E and 5F, in accordance with another important feature of first preferred embodiment bushing 210, bushing sidewall 261 includes interior surface 263 that features a plurality of V-shaped grooves 218 which axially extend from inner end 294 to sealing section 215 and are arranged radially continuously along a circumference of an interior surface 263 of bushing sidewall 261. A width of each helical groove 218A,218B forming V-shaped grooves 218 is represented as a distance between a point R and a point S. Each point R, point S, respectively, is an edge of an individual helical groove 218A,218B. Each individual helical groove 218A,218B forming V-shaped grooves 218 preferably has a width or distance between point R and point S of from about 1 millimeter (0.0394 inches) to about 6 millimeters (0.236 inches). More preferably, each individual helical groove 218A,218B has the width or distance between point R and point S of from 2 millimeters (0.0787 inches) to about 5 millimeters (0.197 inches). Most preferably, the width or distance between point R and point S is about 3 millimeters (0.118 inches). The depth of each helical groove 218A,218B forming V-shaped grooves 218 is represented as a difference between a radius R1 of the inner circle defined by interior surface 263 and a radius R2 of a circle (not shown) defined by connecting a deepest point of each helix groove of V-shaped grooves 218. Each individual helical groove 218A,218B forming V-shaped grooves 218 preferably has a depth or difference between radius R1 and radius R2 of from 0.5 millimeters (0.0197 inches) to about 3 millimeters (0.118 inches). Most preferably, the depth or difference between radius R1 and radius R2 is about 1.01 millimeters (0.0398 inches). Central axis 200 is located at the center of both circles.

With particular reference to FIGS. 5E and 5G, in accordance with yet another important feature and as set forth above, first preferred embodiment bushing 210 includes bushing sidewall 261 which includes interior surface 263 and exterior surface 212. Interior surface 263 and exterior surface 212 include filleted portion 214, and an chamfered portion 216, respectively, adjacent inner end 294 of bushing 210. Filleted portion 214 of interior surface 263 extends axially from a point V to a point Z on inner end 294 and radially from point Q to point P on interior surface 263 of bushing 210. Chamfered portion 216 of exterior surface 212 extends axially from a point Y to point Z on inner end 294 and radially from a point X to a point W on exterior surface 212 of bushing 210. Filleted portion 214 and chamfered portion 216 provides to ease the assembly process for inserting bushing 210 into opening 256 of beam 234 and for inserting inner sleeve 258 into central opening 260 of bushing 210.

First preferred embodiment bushing 210 for auxiliary lift axle/suspension systems of the present invention provides a bushing which maintains even distribution of lubricant on bushing interior surface 263, prevents lubricant from leaking out of the bushing-to-metal sleeve interface, and prevents dirt and contaminants from entering into the interface during operation of the lift axle/suspension system (not shown). More particularly, first preferred embodiment bushing 210 of the present invention includes a plurality of generally opposed helical or V-shaped grooves 218 on sidewall interior surface 263, wherein lubricant is captured, effectively maintaining even distribution of the lubricant and preventing migration of the lubricant during operation of the bushing assembly. Additionally, first preferred embodiment bushing includes a sealing section 215 integrally formed on the interior surface adjacent the outer end 293. When the bushing assembly metal sleeve 258 is inserted into bushing 210, sealing section 215 forms a tight seal between bushing outer end 293 and the metal sleeve, preventing lubricant from leaking out of the bushing-to-metal sleeve interface, and preventing dirt and unwanted contaminants from entering into the interface, during operation of bushing assembly 228.

With reference to FIGS. 6, 6A, 6B, and 6C, a second preferred embodiment bushing 310 of the present invention is utilized in a bushing assembly 328 in an auxiliary lift axle/suspension system, such as auxiliary lift axle/suspension system 10 described above.

With continued reference to FIGS. 6, 6A, 6B, and 6C, second preferred embodiment bushing 310 for auxiliary lift axle/suspension systems of the present invention is generally cylindrical-shaped, formed from urethane, and includes an inner end 394 and an outer end 393. A continuous central opening 360 is formed through bushing 310 and extends from inner end 394 to outer end 393. More specifically, bushing 310 includes a cylindrical sidewall 361 that extends from bushing inner end 394 to bushing outer end 393. Bushing sidewall 361 is formed with a generally flat radially extending flange 359 at bushing outer end 393. Flange 359 includes inner and outer surfaces 380, 382, respectively. Second preferred embodiment bushing 310 preferably has a durometer of from about 88 Shore A to about 96 Shore A. Most preferably, second preferred embodiment bushing 310 has a durometer of from about 89 Shore A to about 91 Shore A.

Figure 8:
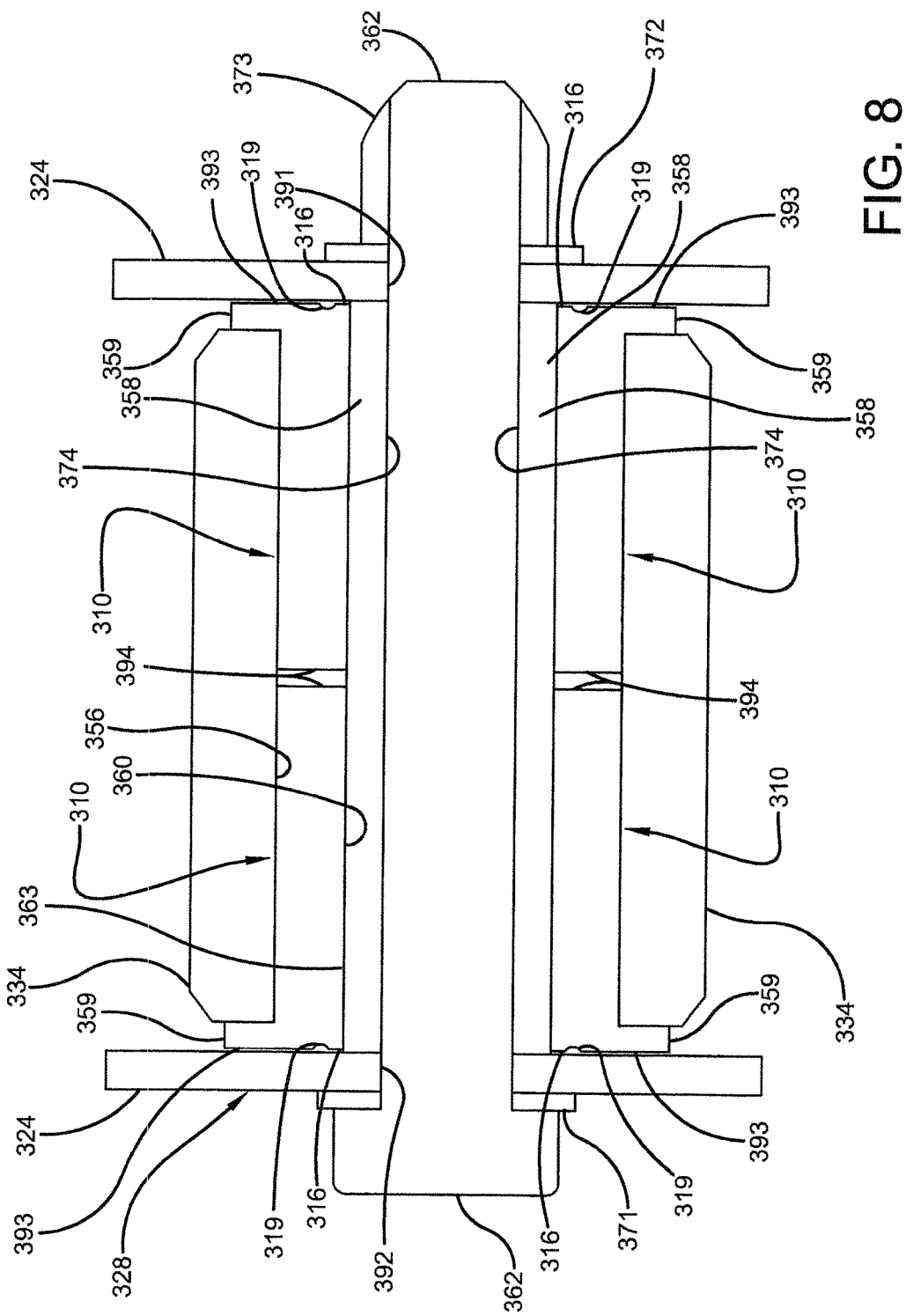
FIG. 8 is a cross-sectional view of a bushing assembly of an auxiliary lift axle/suspension system, showing a pair of the second preferred embodiment bushings incorporated into the assembly.

With particular reference to FIG. 8, bushing assembly 328 includes a pair of second preferred embodiment bushings 310 that are inserted into opposite sides of an opening 356 formed in the rear end of a beam 334 so that a bushing sidewall exterior surface 312 engages the opening and inner flange surface 380 contacts the side of the beam. An inner metal sleeve 358 formed with a continuous opening 374 is disposed through bushing central opening 360 of each bushing 310. A threaded pin 362 is disposed through a first washer 371, through a first opening 392 formed in an axle seat 324, through metal sleeve opening 374, through a second aligned opening 391 formed in the axle seat, through a second washer 372, and engages a threaded nut 373 to complete bushing assembly 328. Bushing assembly 328 pivotally connects beam 334 to axle seat 324. It should be noted that prior to assembly, lubricant is typically applied to the bushing sidewall interior surface 363.

Turning now to FIGS. 6-6C, in accordance with an important feature of second preferred embodiment bushing 310, bushing sidewall 361 includes interior surface 363 that features a plurality of non-continuous grooves 320, which are parallel and radially spaced along the interior sidewall surface, and extend between bushing inner end 394 and bushing lip 316. With particular reference to FIGS. 6B and 6C, the width of each non-continuous groove 320 is represented as the distance between a point B and a point C. Each individual non-continuous groove 320 preferably has a width or distance between point B and point C of from about 1.143 millimeters (0.045 inches) to about 1.905 millimeters (0.075 inches). Most preferably, each individual non-continuous groove 320 has a width or distance between point B and point C of from about 1.473 millimeters (0.058 inches) to about 1.575 millimeters (0.062 inches). The distance between adjacent radially spaced non-continuous grooves 320 is represented as the distance between a point A and point B. Preferably, the distance between point A and point B of first preferred embodiment bushing 310 is from about 6.35 millimeters (0.250 inches) to about 25.4 millimeters (1.000 inches). Most preferably, the distance between point A and point B is from about 7.62 millimeters (0.300 inches) to about 8.255 millimeters (0.325 inches).

In accordance with another important feature of second preferred embodiment bushing 310, a plurality of continuous grooves 318 are formed in interior sidewall surface 363, are parallel to one another, and spaced along the length of the interior sidewall surface from bushing inner end 394 to bushing lip 316. Continuous grooves 318 are generally perpendicular to non-continuous grooves 320. With particular reference to FIGS. 6B and 6C, the distance between bushing inner end 394 and the nearest continuous groove 318 is represented by the distance between a point D and a point E. Second preferred embodiment bushing 310 preferably has a distance between point D and point E of from about 1.27 millimeters (0.050 inches) to about 12.7 millimeters (0.500 inches). Most preferably, the distance between point D and point E is from about 3.048 millimeters (0.120 inches) to about 6.35 millimeters (0.250 inches). The width of each continuous groove 318 is represented by the distance between point E and a point F. Each continuous groove 318 preferably has a width or distance between point E and point F of from about 1.143 millimeters (0.045 inches) to about 1.905 millimeters (0.075 inches). Most preferably, each continuous groove 318 has a width or distance between point E and point F of from about 1.473 millimeters (0.058 inches) to about 1.575 millimeters (0.062 inches). The distance between adjacent continuous grooves 318 is represented by the distance between point F and a point G. First preferred embodiment bushing 310 preferably has a distance between point F and point G of from about 5.08 millimeters (0.200 inches) to about 25.4 millimeters (1.000 inches). Most preferably, the distance between point F and point G is from about 6.35 millimeters (0.250 inches) to about 7.62 millimeters (0.300 inches).

Non-continuous grooves 320 and continuous grooves 318 preferably have a depth of from about 0.762 millimeters (0.030 inches) to about 2.286 millimeters (0.090 inches). Non-continuous grooves 320 and continuous grooves 318 most preferably have a depth of from about 1.27 millimeters (0.050 inches) to about 1.651 millimeters (0.065 inches).

In accordance with yet another important feature of the present invention, second preferred embodiment bushing 310 includes radially extending flange 359, which features a groove 319 formed on outer surface 382 of the flange. Groove 319 forms a lip 316 in outer end 393 of the bushing adjacent flange 359. Lip 316 extends into central opening 360 so that the diameter of the lip is less than the diameter of interior sidewall surface 363. Situated in this manner, when metal sleeve 358 is inserted into bushing 310, lip 316 forms a scraper seal around the circumference of the metal sleeve, sealing the outer end 393 of the bushing-to-metal sleeve interface.

Second preferred embodiment bushing 310 for auxiliary lift axle/suspension systems of the present invention provides a urethane bushing which maintains even distribution of lubricant on bushing interior surface 363, prevents lubricant from leaking out of the bushing-to-metal sleeve interface, and prevents dirt and contaminants from entering into the interface during operation of the lift axle/suspension system (not shown). More particularly, second preferred embodiment bushing 310 of the present invention includes a plurality of non-continuous grooves 320 and a plurality of continuous grooves 318 on sidewall interior surface 363, wherein lubricant is captured, effectively maintaining even distribution of the lubricant and preventing migration of the lubricant during operation of the bushing assembly. Additionally, second preferred embodiment bushing flange 359 includes a lip 316 on its outer end 393. When the bushing assembly metal sleeve 358 is inserted into bushing 310, lip 316 creates a scraper seal between bushing outer end 393 and the metal sleeve, preventing lubricant from leaking out of the bushing-to-metal sleeve interface, and preventing dirt and unwanted contaminants from entering into the interface, during operation of bushing assembly 328.

With reference to FIGS. 7, 7A, 7B, and 7C, a third preferred embodiment bushing 410 of the present invention is utilized in a bushing assembly 428 in an auxiliary lift axle/suspension system, such as auxiliary lift axle/suspension system 10 described above.

With continued reference to FIGS. 7, 7A, 7B, and 7C, third preferred embodiment bushing 410 for auxiliary lift axle/suspension systems of the present invention is generally cylindrical shaped, formed from urethane, and includes an inner end 494 and an outer end 493. A continuous central opening 460 is formed through bushing 410 and extends from inner end 494 to outer end 493. More specifically, bushing 410 includes a sidewall 461 that extends from bushing inner end 494 to bushing outer end 493. Bushing sidewall 461 is formed with a generally flat radially extending flange 459 at bushing outer end 493. Flange 459 includes inner and outer surfaces 480, 482, respectively. Third preferred embodiment bushing 410 preferably has a durometer of from about 88 Shore A to about 96 Shore A. Most preferably, third preferred embodiment bushing 410 has a durometer of from about 89 Shore A to about 91 Shore A.

Figure 9:
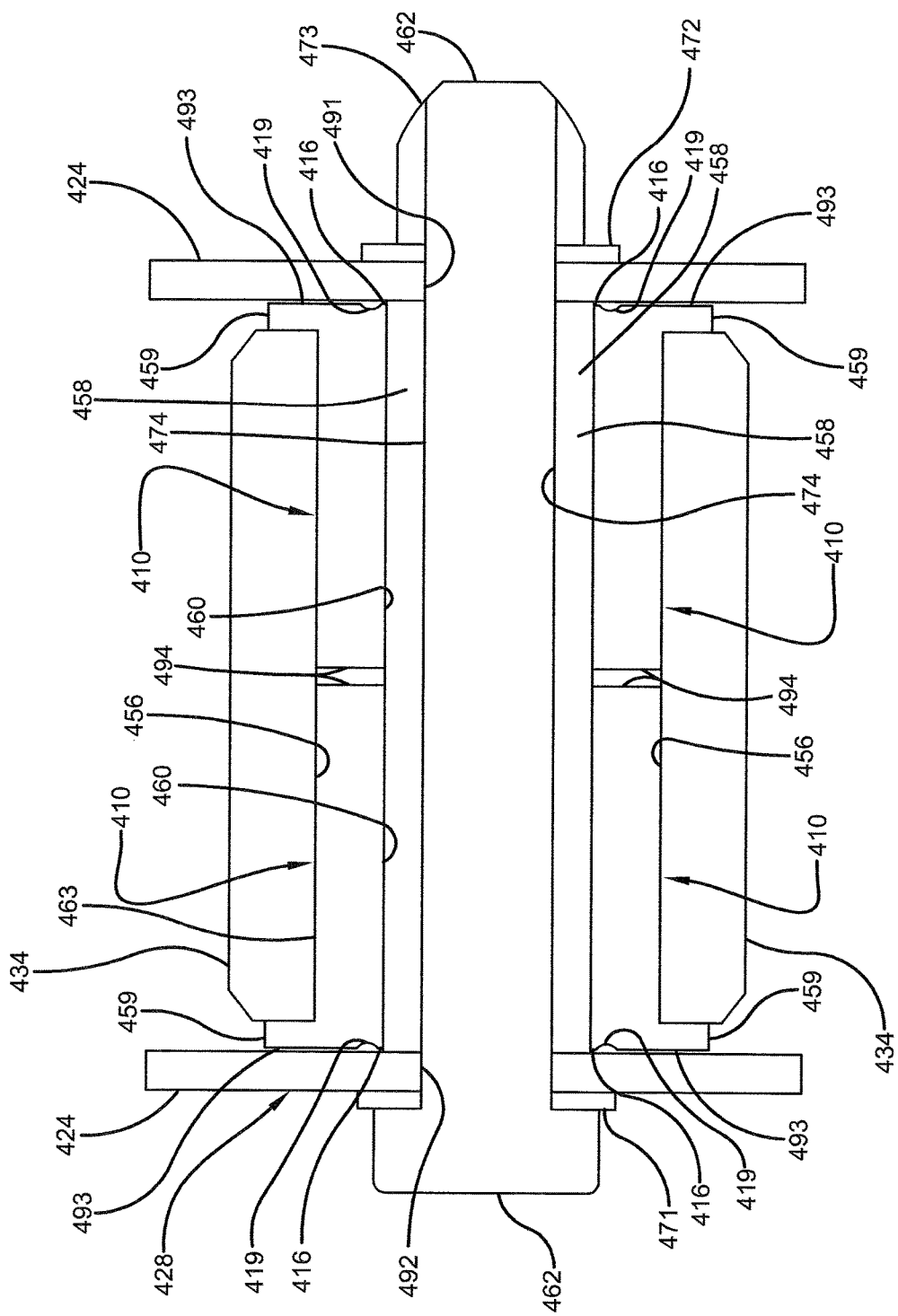
FIG. 9 is a cross-sectional view of a bushing assembly of an auxiliary lift axle/suspension system, showing a pair of the third preferred embodiment bushings incorporated into the assembly.

With particular reference to FIG. 9, bushing assembly 428 includes a pair of third preferred embodiment bushings 410 that are inserted into opposite sides of an opening 456 formed in the rear end of a beam 434 so that a bushing sidewall exterior surface 412 engages the opening and flange interior surface 480 contacts the side of the beam. An inner metal sleeve 458 formed with a continuous opening 474 is disposed through bushing central opening 460 of each bushing 410. A threaded pin 462 is disposed through a first washer 471, through a first opening 492 formed in an axle seat 424, through metal sleeve opening 474, through a second aligned opening 491 formed in the axle seat, through a second washer 472, and engages a threaded nut 473 to complete bushing assembly 428. Bushing assembly 428 pivotally connects beam 434 to axle seat 424. It should be noted that prior to assembly, lubricant is typically applied to the bushing sidewall interior surface 463.

In accordance with an important feature of third preferred embodiment bushing 410, bushing sidewall 461 includes interior surface 463 that features a plurality of spiral grooves 418, which spiral parallel relative to one another along the interior sidewall surface, and extend between bushing inner end 494 and bushing lip 416. Interior bushing sidewall surface 463 also features a plurality of counter spiral grooves 420 which spiral parallel relative to one another and directionally opposed to spiral grooves 418 along the interior sidewall surface, and extend between bushing inner end 494 and bushing lip 416. Spiral grooves 418 and counter spiral grooves 420 interact with one another to create a channeled cross-hatch pattern over bushing sidewall interior surface 463.

With particular reference to FIGS. 7B and 7C, adjacent spiral grooves 418 are preferably spaced circumferentially around interior sidewall surface 463 and are generally parallel to one another. The width of each individual spiral groove 418 is represented as the width between a point H and a second point I. Each spiral groove 418 preferably has a width or distance between point H and point I of from about 1.143 millimeters (0.045 inches) to about 1.905 millimeters (0.075 inches). Most preferably, each spiral groove 418 has a width between point H and point I of from about 1.473 millimeters (0.058 inches) to about 1.575 millimeters (0.062 inches). Each individual spiral groove 418 preferably has a pitch of from about 50.8 millimeters (2 inches) to about 254 millimeters (10 inches). The pitch of each individual spiral groove 418 is measured as the distance between the end of the spiral groove adjacent inner end 494 to a full hypothetical helical turn of the spiral groove extending axially from interior sidewall surface 463 adjacent outer end 493. Most preferably, each spiral groove 418 has a pitch of from about 101.6 millimeters (4 inches) to about 127 millimeters (5 inches). The distance between adjacent spiral grooves 418 is represented by the distance between a point U and point I. Third preferred embodiment bushing 410 preferably has a distance between point U and point I of from about 5.08 millimeters (0.200 inches) to about 19.05 millimeters (0.750 inches). Most preferably, the distance between point U and point I is from about 5.715 millimeters (0.225 inches) to about 6.985 millimeters (0.275 inches).

With continued reference to FIGS. 7B and 7C, consecutive counter spiral grooves 420 are preferably spaced circumferentially around interior sidewall surface 463 and are generally parallel to one another. The width of each individual counter spiral groove 420 is represented as the width between a point J and a second point K. Each individual counter spiral groove 420 preferably has a width or distance between point J and point K of from about 1.143 millimeters (0.045 inches), to about 1.905 millimeters (0.075 inches). Most preferably, each individual counter spiral groove 420 has a width between point J and point K of from about 1.473 millimeters (0.058 inches) to about 1.575 millimeters (0.062 inches). Each individual counter spiral groove 420 preferably has a pitch of from about 50.8 millimeters (2 inches) to about 254 millimeters (10 inches). The pitch of each individual counter spiral groove 420 is measured as the distance between the end of the counter spiral groove adjacent inner end 494 to a full hypothetical helical turn of the counter spiral groove extending axially from interior sidewall surface 463 adjacent outer end 493. Most preferably, each counter spiral groove 420 has a pitch of from about 101.6 millimeters (4 inches) to about 127 millimeters (5 inches). The distance between adjacent spaced counter spiral grooves 420 is represented as the distance between a point T and point K. Preferably, the distance between point T and point K of first preferred embodiment bushing 410 is from about 5.08 millimeters (0.200 inches) to about 19.05 millimeters (0.750 inches). Most preferably, the distance between point T and point K is from about 5.715 millimeters (0.225 inches) to about 6.985 millimeters (0.275 inches).

Spiral grooves 418 and counter spiral grooves 420 preferably have a depth of from about 0.762 millimeters (0.030 inches) to about 22.86 millimeters (0.90 inches). Spiral grooves 418 and counter spiral grooves 420 most preferably have a depth of from about 1.27 millimeters (0.050 inches) to about 1.651 millimeters (0.065 inches).

In accordance with yet another important feature of the present invention, third preferred embodiment bushing 410 radially extending flange 459 features a groove 419 formed on outer surface 482 of the flange. Groove 419 forms a lip 416 in outer end 493 of the bushing adjacent flange 459. Lip 416 extends into central opening 460 such that the diameter of the lip is less than the diameter of interior sidewall surface 463. Situated in this manner, when metal sleeve 458 is inserted into bushing 410, lip 416 forms a scraper seal around the circumference of the metal sleeve, sealing the outer end of the bushing-to-metal sleeve interface.

Third preferred embodiment bushing 410 for auxiliary lift axle/suspension systems of the present invention provides a urethane bushing which maintains even distribution of lubricant on bushing interior surface 463, prevents lubricant from leaking out of the bushing-to-metal sleeve interface, and prevents dirt and contaminants from entering into the interface during operation of the lift axle/suspension system (not shown). More particularly, third preferred embodiment bushing 410 of the present invention includes a plurality of spiral grooves 418 and a plurality of counter spiral grooves 420 on sidewall interior surface 463, wherein lubricant is captured, effectively maintaining even distribution of the lubricant and preventing migration of the lubricant during operation of the bushing assembly. Additionally, third preferred embodiment bushing flange 459 includes a lip 416 near its outer end 493. When the bushing assembly metal sleeve 458 is inserted into bushing 410, lip 416 creates a scraper seal between bushing outer end 493 and the metal sleeve, preventing lubricant from leaking out of the bushing-to-metal sleeve interface, and preventing dirt and unwanted contaminants from entering into bushing-to-metal sleeve interface, during operation of bushing assembly 428.

It should be understood that first, second and third preferred embodiment bushings 210, 310, 410 of the present invention could be utilized on all types of heavy-duty axle/suspension systems without changing the overall concept or operation of the invention. Moreover, first, second, and third preferred embodiment bushings 210, 310, 410 of the present invention could be utilized on lift axle/suspension systems that are steerable or non-steerable without changing the overall concept or operation of the present invention. It is also understood that first, second, and third preferred embodiment bushings 210, 310, 410 of the present invention could be utilized with other types of lift axle/suspension systems without changing the overall concept or operation of the present invention. It is further understood that first, second, and third preferred embodiment bushings 210, 310, 410 of the present invention could be utilized on trucks, tractors, trailers, or other heavy-duty vehicles without changing the overall concept or operation of the present invention. It is even further understood that first, second, and third preferred embodiment bushings 210, 310, 410 of the present invention could be formed using other materials having a similar durometer without changing the overall concept or operation of the present invention. It is understood that first, second and third preferred embodiment bushings 210, 310, 410 of the present invention could be utilized on axle/suspension systems having either a trailing arm or leading arm configuration without changing the overall concept or operation of the present invention. It is also understood that first, second, and third preferred embodiment bushings 210, 310, 410 of the present invention could have different general shapes without changing the overall concept or operation of the present invention. It should be understood that grooves 218, 318, 320, 418, 420 could have a semicircular, polygonal or other shaped cross section without changing the overall concept or operation of the present invention.

The present invention has been described with reference to specific embodiments. It is understood that this description and illustration is by way of example and not by way of limitation. Potential modifications and alterations will occur to others upon a reading and understanding of this disclosure, and it is understood that the invention includes all such modifications, alterations and equivalents thereof.

Accordingly, the bushing for lift axle/suspension systems is simplified, provides an effective, safe, inexpensive and efficient structure and method which achieves all the enumerated objectives, provides for eliminating difficulties encountered with prior bushings, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the bushing for lift axle/suspension systems is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A bushing for a bushing assembly of a heavy-duty vehicle axle/suspension system, said bushing comprising:
 a cylindrical sidewall including:
  an inner end;
  an outer end;
  a central opening extending from said inner end to said outer end
  an exterior surface;
  an interior surface including at least one groove formed in said interior surface of the bushing, said at least one groove comprising a generally V-shaped groove, said interior surface of the bushing comprising a sealing section integrally formed on the interior surface adjacent the outer end, said generally V-shaped groove extending axially from the inner end to said sealing section and being arranged radially along a circumference of the interior surface of the bushing; and a flange extending radially from the outer end of said cylindrical sidewall.

2. The bushing for a bushing assembly of a heavy-duty vehicle axle/suspension system of claim 1, said at least one groove comprising a plurality of V-shaped grooves, wherein each one of said plurality of V-shaped grooves are generally equally spaced from one another at an angle of from about 36 degrees to about 120 degrees relative to a central axis.

3. The bushing for a bushing assembly of a heavy-duty vehicle axle/suspension system of claim 1, said interior surface of the bushing comprising a lip formed on the interior surface adjacent said flange, wherein said lip forms a scraper seal between the bushing and a metal sleeve inserted into said bushing assembly.

4. The bushing for a bushing assembly of a heavy-duty vehicle axle/suspension system of claim 1, wherein said cylindrical sidewall includes a filleted portion extending from the interior surface to the inner end of said bushing.

5. The bushing for a bushing assembly of a heavy-duty vehicle axle/suspension system of claim 1, wherein said cylindrical sidewall includes an chamfered portion extending from the exterior surface to the inner end of the bushing.

6. The bushing for a bushing assembly of a heavy-duty vehicle axle/suspension system of claim 1, wherein said flange is generally flat.

7. The bushing for a bushing assembly for a heavy-duty vehicle axle/suspension system of claim 1, wherein said interior surface includes 3 to 10 said grooves.

8. The bushing for a bushing assembly of a heavy-duty vehicle axle/suspension system of claim 1, wherein said at least one groove has a generally semi-circular cross-section.

9. The bushing for a bushing assembly of a heavy-duty vehicle axle/suspension system of claim 1, wherein said at least one groove includes a generally polygonal cross-section.

10. The bushing for a bushing assembly of a heavy-duty vehicle axle/suspension system of claim 1, wherein said at least one groove has a depth of from about 0.5 millimeters to about 3 millimeters.

11. The bushing for a bushing assembly of a heavy-duty vehicle axle/suspension system of claim 1, wherein said at least one groove has a depth of about 1.01 millimeters.

12. The bushing for a bushing assembly of a heavy-duty vehicle axle/suspension system of claim 1, wherein said at least one groove includes a width of from about 2 millimeters to about 5 millimeters.

13. The bushing for a bushing assembly of a heavy-duty vehicle axle/suspension system of claim 1, wherein said at least one groove includes a width of about 3 millimeters.

14. The bushing for a bushing assembly of a heavy-duty vehicle axle/suspension system of claim 1, said bushing including a durometer of from about 88 Shore A to about 96 Shore A.

15. The bushing for a bushing assembly of a heavy-duty vehicle axle/suspension system of claim 1, said bushing including a durometer of from about 89 Shore A to about 91 Shore A.

16. A bushing for a bushing assembly of a heavy-duty vehicle axle/suspension system, said bushing comprising:
    a cylindrical sidewall including:
        an inner end;
        an outer end;
        a central opening extending from said inner end to said outer end
        an exterior surface;
        an interior surface including at least one groove formed in said interior surface of the bushing; and
    a flange extending radially from the outer end of said cylindrical sidewall, said interior surface of the bushing including a lip formed on the interior surface adjacent said flange, said lip forming a scraper seal between the bushing and a metal sleeve inserted into said bushing assembly, said at least one groove comprising at least a pair of non-continuous grooves and at least a pair of continuous grooves, said pair of non-continuous grooves being parallel to one another and being radially spaced along the interior surface, extending between said inner end and the lip, said pair of continuous grooves being parallel to one another and being axially spaced along the interior surface, extending between said inner end and the lip, and being generally perpendicular to said pair of non-continuous grooves.

17. A bushing for a bushing assembly of a heavy-duty vehicle axle/suspension system, said bushing comprising:
    a cylindrical sidewall including:
        an inner end;
        an outer end;
        a central opening extending from said inner end to said outer end
        an exterior surface;
        an interior surface including at least one groove formed in said interior surface of the bushing; and
    a flange extending radially from the outer end of said cylindrical sidewall, said interior surface of the bushing including a lip formed on the interior surface adjacent said flange, said lip forming a scraper seal between the bushing and a metal sleeve inserted into said bushing assembly, said at least one groove comprising at least a pair of spiral grooves and at least a pair of counter spiral grooves formed on the interior surface, said pair of spiral grooves being parallel to one another and extending an entire length of said interior surface between said inner end and the lip, said pair of counter spiral grooves being parallel to one another and extending said entire length of the interior surface between said inner end and the lip and being directionally opposed to said pair of spiral grooves.

18. The bushing for a bushing assembly of a heavy-duty vehicle axle/suspension system of claim 17, said pair of spiral grooves and the pair of counter spiral grooves interacting with one another and creating a channeled cross-hatch pattern over said interior surface.

* * * * *